United States Patent
Ramnani

(10) Patent No.: US 8,191,008 B2
(45) Date of Patent: May 29, 2012

(54) SIMULATING MULTI-MONITOR FUNCTIONALITY IN A SINGLE MONITOR ENVIRONMENT

(75) Inventor: Subash Ramnani, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 798 days.

(21) Appl. No.: 11/243,512

(22) Filed: Oct. 3, 2005

(65) Prior Publication Data

US 2007/0079252 A1    Apr. 5, 2007

(51) Int. Cl.
G06F 3/00    (2006.01)
(52) U.S. Cl. ........ 715/788; 715/787; 715/764; 715/744; 715/745; 715/746; 715/747
(58) Field of Classification Search .................. 715/788, 715/787, 764, 744, 745, 746, 747
See application file for complete search history.

(56) References Cited

U.S. PATENT DOCUMENTS

| | | |
|---|---|---|
| 4,138,719 A | 2/1979 | Swanstrom et al. |
| 4,807,029 A | 2/1989 | Tanaka et al. |
| 4,928,247 A | 5/1990 | Doyle et al. |
| 4,937,036 A | 6/1990 | Beard et al. |
| 4,949,248 A | 8/1990 | Caro |
| 4,965,819 A | 10/1990 | Kannes |
| 4,974,173 A | 11/1990 | Stefik et al. |
| 5,021,949 A | 6/1991 | Morten et al. |
| 5,062,060 A | 10/1991 | Kolnick et al. |
| 5,072,412 A | 12/1991 | Henderson, Jr. et al. |
| 5,121,497 A | 6/1992 | Kerr et al. |
| 5,241,625 A | 8/1993 | Epard et al. |
| 5,307,456 A | 4/1994 | MacKay |
| 5,313,581 A | 5/1994 | Giokas et al. |
| 5,317,732 A | 5/1994 | Gerlach, Jr. et al. |

(Continued)

FOREIGN PATENT DOCUMENTS

EP    0475581    3/1992

(Continued)

OTHER PUBLICATIONS

Dennis Baker, Using Xinerama to Multihead XFree86 V.4.0+ [Online], Nov. 15, 2002, XP002417796. Available at: http://www.tldp.org/HOWTO/Xinerama-HOWTO/.

(Continued)

*Primary Examiner* — William Bashore
*Assistant Examiner* — Mylinh Tran
(74) *Attorney, Agent, or Firm* — Foley & Lardner LLP; John D. Lanza

(57) ABSTRACT

The systems and methods of the present provide techniques for virtualizing, simulating or providing multiple displays for an environment having one display device or less display devices than desired. The techniques of the present invention virtualize a client's display environment by modifying and controlling the behavior and appearance of an application window displayed on the client based on a desired display layout for the client. The present invention provides a window message processing mechanism to intercept a selected message to a window of an application. The window message processing mechanism compares the behavior and appearance of the window in view of the desired display layout and modifies the message to display the window on the client based on the desired display layout. As such, the present invention processes selected window messages to translate the behavior or appearance of the window to the desired display layout.

25 Claims, 9 Drawing Sheets

U.S. PATENT DOCUMENTS

| | | | |
|---|---|---|---|
| 5,359,712 A | 10/1994 | Cohen et al. | |
| 5,382,972 A | 1/1995 | Kannes | |
| 5,388,197 A | 2/1995 | Rayner | |
| 5,392,223 A | 2/1995 | Caci | |
| 5,392,400 A | 2/1995 | Berkowitz et al. | |
| 5,404,316 A | 4/1995 | Klingler et al. | |
| 5,408,655 A | 4/1995 | Oren et al. | |
| 5,432,932 A | 7/1995 | Chen et al. | |
| 5,437,025 A | 7/1995 | Bale et al. | |
| 5,461,711 A | 10/1995 | Wang et al. | |
| 5,550,965 A | 8/1996 | Gabbe et al. | |
| 5,572,643 A | 11/1996 | Judson | |
| 5,574,845 A | 11/1996 | Benson et al. | |
| 5,577,188 A | 11/1996 | Zhu | |
| 5,577,254 A | 11/1996 | Gilbert | |
| 5,619,638 A | 4/1997 | Duggan et al. | |
| 5,657,390 A | 8/1997 | Elgamal et al. | |
| 5,717,879 A | 2/1998 | Moran et al. | |
| 5,721,827 A | 2/1998 | Logan et al. | |
| 5,727,950 A | 3/1998 | Cook et al. | |
| 5,729,689 A | 3/1998 | Allard et al. | |
| 5,732,216 A | 3/1998 | Logan et al. | |
| 5,742,797 A | 4/1998 | Celi et al. | |
| 5,745,759 A * | 4/1998 | Hayden et al. | 719/318 |
| 5,748,499 A | 5/1998 | Trueblood | |
| 5,758,110 A | 5/1998 | Boss et al. | |
| 5,761,656 A | 6/1998 | Ben-Shachar | |
| 5,768,614 A | 6/1998 | Takagi et al. | |
| 5,802,206 A | 9/1998 | Marold et al. | |
| 5,822,436 A | 10/1998 | Rhoads | |
| 5,832,119 A | 11/1998 | Rhoads | |
| 5,835,090 A * | 11/1998 | Clark et al. | 715/764 |
| 5,838,300 A | 11/1998 | Takagi et al. | |
| 5,838,458 A | 11/1998 | Tsai | |
| 5,838,906 A | 11/1998 | Doyle et al. | |
| 5,841,978 A | 11/1998 | Rhoads | |
| 5,862,260 A | 1/1999 | Rhoads | |
| 5,886,707 A | 3/1999 | Berg | |
| 5,893,053 A | 4/1999 | Trueblood | |
| 5,907,704 A | 5/1999 | Gudmundson et al. | |
| 5,909,559 A | 6/1999 | So | |
| 5,915,001 A | 6/1999 | Uppaluru | |
| 5,923,736 A | 7/1999 | Shachar | |
| 5,935,212 A | 8/1999 | Kalajan et al. | |
| 5,968,132 A | 10/1999 | Tokunaga et al. | |
| 5,983,190 A | 11/1999 | Trower, II et al. | |
| 5,990,852 A | 11/1999 | Szamrej | |
| 6,003,030 A | 12/1999 | Kenner et al. | |
| 6,006,242 A | 12/1999 | Poole et al. | |
| 6,011,537 A | 1/2000 | Slotznick | |
| 6,022,315 A | 2/2000 | Iliff | |
| 6,052,120 A | 4/2000 | Nahi et al. | |
| 6,111,954 A | 8/2000 | Rhoads | |
| 6,122,403 A | 9/2000 | Rhoads | |
| 6,141,699 A | 10/2000 | Luzzi et al. | |
| 6,166,729 A | 12/2000 | Acosta et al. | |
| 6,173,316 B1 | 1/2001 | De Boor et al. | |
| 6,181,736 B1 | 1/2001 | McLaughlin et al. | |
| 6,185,625 B1 | 2/2001 | Tso et al. | |
| 6,199,076 B1 | 3/2001 | Logan et al. | |
| 6,199,753 B1 | 3/2001 | Tracy et al. | |
| 6,201,948 B1 | 3/2001 | Cook et al. | |
| 6,206,829 B1 | 3/2001 | Iliff | |
| 6,219,786 B1 | 4/2001 | Cunningham et al. | |
| 6,233,617 B1 | 5/2001 | Rothwein et al. | |
| 6,237,138 B1 | 5/2001 | Hameluck et al. | |
| 6,243,375 B1 | 6/2001 | Speicher | |
| 6,256,773 B1 | 7/2001 | Bowman-Amuah | |
| 6,263,363 B1 | 7/2001 | Rosenblatt et al. | |
| 6,286,030 B1 | 9/2001 | Wenig et al. | |
| 6,286,036 B1 | 9/2001 | Rhoads | |
| 6,289,382 B1 | 9/2001 | Bowman-Amuah | |
| 6,295,340 B1 | 9/2001 | Cannon et al. | |
| 6,317,761 B1 | 11/2001 | Landsman et al. | |
| 6,317,781 B1 | 11/2001 | De Boor et al. | |
| 6,321,252 B1 | 11/2001 | Bhola et al. | |
| 6,324,573 B1 | 11/2001 | Rhoads | |
| 6,324,647 B1 | 11/2001 | Bowman-Amuah | |
| 6,332,163 B1 | 12/2001 | Bowman-Amuah | |
| 6,339,832 B1 | 1/2002 | Bowman-Amuah | |
| 6,345,239 B1 | 2/2002 | Bowman-Amuah | |
| 6,351,777 B1 | 2/2002 | Simonoff | |
| 6,356,437 B1 | 3/2002 | Mitchell et al. | |
| 6,366,933 B1 | 4/2002 | Ball et al. | |
| 6,370,573 B1 | 4/2002 | Bowman-Amuah | |
| 6,381,341 B1 | 4/2002 | Rhoads | |
| 6,400,806 B1 | 6/2002 | Uppaluru | |
| 6,400,996 B1 | 6/2002 | Hoffberg et al. | |
| 6,401,118 B1 | 6/2002 | Thomas | |
| 6,405,252 B1 | 6/2002 | Gupta et al. | |
| 6,405,364 B1 | 6/2002 | Bowman-Amuah | |
| 6,408,331 B1 | 6/2002 | Rhoads | |
| 6,421,726 B1 | 7/2002 | Kenner et al. | |
| 6,427,063 B1 | 7/2002 | Cook et al. | |
| 6,427,132 B1 | 7/2002 | Bowman-Amuah | |
| 6,434,568 B1 | 8/2002 | Bowman-Amuah | |
| 6,434,628 B1 | 8/2002 | Bowman-Amuah | |
| 6,437,818 B1 | 8/2002 | Ludwig et al. | |
| 6,438,231 B1 | 8/2002 | Rhoads | |
| 6,438,594 B1 | 8/2002 | Bowman-Amuah | |
| 6,442,748 B1 | 8/2002 | Bowman-Amuah | |
| 6,445,468 B1 | 9/2002 | Tsai | |
| 6,466,654 B1 | 10/2002 | Cooper et al. | |
| 6,470,381 B2 | 10/2002 | De Boor et al. | |
| 6,473,745 B2 * | 10/2002 | Doerr et al. | 706/11 |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,482,156 B2 | 11/2002 | Iliff | |
| 6,496,850 B1 | 12/2002 | Bowman-Amuah | |
| 6,498,955 B1 | 12/2002 | McCarthy et al. | |
| 6,502,102 B1 | 12/2002 | Haswell et al. | |
| 6,502,125 B1 | 12/2002 | Kenner et al. | |
| 6,502,131 B1 | 12/2002 | Vaid et al. | |
| 6,502,213 B1 | 12/2002 | Bowman-Amuah | |
| 6,519,571 B1 | 2/2003 | Guheen et al. | |
| 6,523,027 B1 | 2/2003 | Underwood | |
| 6,526,335 B1 | 2/2003 | Treyz et al. | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,336 B1 | 3/2003 | Vock et al. | |
| 6,539,396 B1 | 3/2003 | Bowman-Amuah | |
| 6,539,429 B2 | 3/2003 | Rakavy et al. | |
| 6,549,949 B1 | 4/2003 | Bowman-Amuah | |
| 6,550,057 B1 | 4/2003 | Bowman-Amuah | |
| 6,553,129 B1 | 4/2003 | Rhoads | |
| 6,567,533 B1 | 5/2003 | Rhoads | |
| 6,571,282 B1 | 5/2003 | Bowman-Amuah | |
| 6,573,907 B1 | 6/2003 | Madrane | |
| 6,574,672 B1 | 6/2003 | Mitchell et al. | |
| 6,578,068 B1 | 6/2003 | Bowman-Amuah | |
| 6,580,808 B2 | 6/2003 | Rhoads | |
| 6,584,493 B1 | 6/2003 | Butler | |
| 6,584,569 B2 | 6/2003 | Reshef et al. | |
| 6,590,998 B2 | 7/2003 | Rhoads | |
| 6,601,087 B1 | 7/2003 | Zhu et al. | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,479 B2 | 8/2003 | Cook et al. | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,611,867 B1 | 8/2003 | Bowman-Amuah | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,629,081 B1 | 9/2003 | Cornelius et al. | |
| 6,633,878 B1 | 10/2003 | Underwood | |
| 6,636,242 B2 | 10/2003 | Bowman-Amuah | |
| 6,640,145 B2 | 10/2003 | Hoffberg et al. | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,647,128 B1 | 11/2003 | Rhoads | |
| 6,647,130 B2 | 11/2003 | Rhoads | |

| | | |
|---|---|---|
| 6,658,464 B2 | 12/2003 | Reisman |
| 6,662,357 B1 | 12/2003 | Bowman-Amuah |
| 6,665,706 B2 | 12/2003 | Kenner et al. |
| 6,671,818 B1 | 12/2003 | Mikurak |
| 6,675,204 B2 | 1/2004 | De Boor et al. |
| 6,678,864 B1 | 1/2004 | Tsai |
| 6,681,029 B1 | 1/2004 | Rhoads |
| 6,687,745 B1 | 2/2004 | Franco et al. |
| 6,697,894 B1 | 2/2004 | Mitchell et al. |
| 6,700,990 B1 | 3/2004 | Rhoads |
| 6,701,345 B1 | 3/2004 | Carley et al. |
| 6,701,514 B1 | 3/2004 | Haswell et al. |
| 6,704,873 B1 | 3/2004 | Underwood |
| 6,711,474 B1 | 3/2004 | Treyz et al. |
| 6,715,145 B1 | 3/2004 | Bowman-Amuah |
| 6,718,535 B1 | 4/2004 | Underwood |
| 6,721,703 B2 | 4/2004 | Jackson et al. |
| 6,721,713 B1 | 4/2004 | Guheen et al. |
| 6,742,015 B1 | 5/2004 | Bowman-Amuah |
| 6,751,320 B2 | 6/2004 | Rhoads |
| 6,760,463 B2 | 7/2004 | Rhoads |
| 6,774,926 B1 | 8/2004 | Ellis et al. |
| 6,775,392 B1 | 8/2004 | Rhoads |
| 6,795,506 B1 | 9/2004 | Zhang et al. |
| 6,799,221 B1 | 9/2004 | Kenner et al. |
| RE38,609 E | 10/2004 | Chen et al. |
| 6,801,927 B1 | 10/2004 | Smith et al. |
| 6,802,041 B1 | 10/2004 | Rehm |
| 6,813,366 B1 | 11/2004 | Rhoads |
| 6,816,904 B1 | 11/2004 | Ludwig et al. |
| 6,824,044 B1 | 11/2004 | Lapstun et al. |
| 6,842,906 B1 | 1/2005 | Bowman-Amuah |
| 6,849,045 B2 | 2/2005 | Iliff |
| 6,850,252 B1 | 2/2005 | Hoffberg |
| 6,870,921 B1 | 3/2005 | Elsey et al. |
| 6,877,043 B2 | 4/2005 | Mallory et al. |
| 6,879,701 B1 | 4/2005 | Rhoads |
| 6,880,123 B1 | 4/2005 | Landsman et al. |
| 6,885,736 B2 | 4/2005 | Uppaluru |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,546 B1 | 6/2005 | Haswell et al. |
| 6,914,519 B2 | 7/2005 | Beyda |
| 6,934,376 B1 | 8/2005 | McLaughlin et al. |
| 6,944,279 B2 | 9/2005 | Elsey et al. |
| 6,954,800 B2 | 10/2005 | Mallory |
| 6,957,186 B1 | 10/2005 | Guheen et al. |
| 6,968,057 B2 | 11/2005 | Rhoads |
| 6,968,364 B1 | 11/2005 | Wong et al. |
| 6,975,655 B2 | 12/2005 | Fischer et al. |
| 6,986,459 B2 | 1/2006 | Paul et al. |
| 6,988,126 B2 | 1/2006 | Wilcock et al. |
| 6,988,236 B2 | 1/2006 | Ptasinski et al. |
| 6,993,101 B2 | 1/2006 | Trachewsky et al. |
| 6,996,605 B2 | 2/2006 | Low et al. |
| 7,000,019 B2 | 2/2006 | Low et al. |
| 7,000,031 B2 | 2/2006 | Fischer et al. |
| 7,000,180 B2 | 2/2006 | Balthaser |
| 7,006,881 B1 | 2/2006 | Hoffberg et al. |
| 7,013,323 B1 | 3/2006 | Thomas et al. |
| 7,016,084 B2 | 3/2006 | Tsai |
| 7,023,979 B1 | 4/2006 | Wu et al. |
| 7,024,456 B1 | 4/2006 | Simonoff |
| 7,027,055 B2 | 4/2006 | Anderson et al. |
| 7,032,030 B1 | 4/2006 | Codignotto |
| 7,035,285 B2 | 4/2006 | Holloway et al. |
| 7,035,427 B2 | 4/2006 | Rhoads |
| 7,035,907 B1 | 4/2006 | Decasper et al. |
| 7,043,529 B1 | 5/2006 | Simonoff |
| 7,047,092 B2 * | 5/2006 | Wimsatt ............... 700/83 |
| 7,054,465 B2 | 5/2006 | Rhoads |
| 7,058,697 B2 | 6/2006 | Rhoads |
| 7,069,234 B1 | 6/2006 | Cornelius et al. |
| 7,069,332 B2 | 6/2006 | Shibata et al. |
| 7,073,126 B1 | 7/2006 | Khandekar |
| 7,073,189 B2 | 7/2006 | McElhatten et al. |
| 7,082,572 B2 | 7/2006 | Pea et al. |
| 7,089,487 B2 | 8/2006 | Tsai |
| 7,092,370 B2 | 8/2006 | Jiang et al. |
| 7,100,195 B1 | 8/2006 | Underwood |
| 7,103,197 B2 | 9/2006 | Rhoads |
| 7,113,596 B2 | 9/2006 | Rhoads |
| 7,113,614 B2 | 9/2006 | Rhoads |
| 7,116,781 B2 | 10/2006 | Rhoads |
| 7,124,101 B1 | 10/2006 | Mikurak |
| 7,124,175 B1 | 10/2006 | Wolfe et al. |
| 7,130,403 B2 | 10/2006 | Caspi et al. |
| 7,130,807 B1 | 10/2006 | Mikurak |
| 7,133,837 B1 | 11/2006 | Barnes, Jr. |
| 7,139,999 B2 | 11/2006 | Bowman-Amuah |
| 7,149,698 B2 | 12/2006 | Guheen et al. |
| 7,149,788 B1 | 12/2006 | Gundla et al. |
| 7,165,041 B1 | 1/2007 | Guheen et al. |
| 7,167,844 B1 | 1/2007 | Leong et al. |
| 7,171,016 B1 | 1/2007 | Rhoads |
| 7,171,174 B2 | 1/2007 | Ellis et al. |
| 7,174,126 B2 | 2/2007 | McElhatten et al. |
| 7,184,531 B2 | 2/2007 | Crouch |
| 7,185,283 B1 | 2/2007 | Takahashi |
| 7,213,211 B1 | 5/2007 | Sanders et al. |
| 7,225,130 B2 | 5/2007 | Roth et al. |
| 7,228,340 B2 | 6/2007 | De Boor et al. |
| 7,313,613 B1 | 12/2007 | Brooking et al. |
| 7,398,320 B1 | 7/2008 | Minakuchi et al. |
| 7,401,116 B1 | 7/2008 | Chalfin et al. |
| 7,490,166 B2 | 2/2009 | Yang et al. |
| 7,558,806 B2 | 7/2009 | Bobrovskiy et al. |
| 2001/0019630 A1 | 9/2001 | Johnson |
| 2002/0032770 A1 | 3/2002 | Fertell et al. |
| 2002/0033844 A1 | 3/2002 | Levy et al. |
| 2002/0038388 A1 | 3/2002 | Netter |
| 2002/0048450 A1 | 4/2002 | Zetts |
| 2002/0126144 A1 * | 9/2002 | Chenede ............... 345/738 |
| 2002/0149617 A1 | 10/2002 | Becker |
| 2003/0055896 A1 | 3/2003 | Hu et al. |
| 2003/0079224 A1 | 4/2003 | Komar et al. |
| 2003/0110266 A1 | 6/2003 | Rollins et al. |
| 2003/0135656 A1 | 7/2003 | Schneider et al. |
| 2003/0163704 A1 | 8/2003 | Dick et al. |
| 2003/0177172 A1 | 9/2003 | Duursma et al. |
| 2003/0191799 A1 | 10/2003 | Araujo et al. |
| 2003/0208529 A1 | 11/2003 | Pendyala et al. |
| 2003/0226038 A1 | 12/2003 | Raanan et al. |
| 2004/0002048 A1 | 1/2004 | Thurmaier et al. |
| 2004/0017394 A1 | 1/2004 | Adachi |
| 2004/0031058 A1 | 2/2004 | Reisman |
| 2004/0044521 A1 | 3/2004 | Chen et al. |
| 2004/0103438 A1 | 5/2004 | Yan et al. |
| 2004/0143602 A1 | 7/2004 | Ruiz et al. |
| 2004/0207723 A1 | 10/2004 | Davis et al. |
| 2004/0240387 A1 | 12/2004 | Nuzman et al. |
| 2004/0267820 A1 | 12/2004 | Boss et al. |
| 2004/0267952 A1 | 12/2004 | He et al. |
| 2005/0019014 A1 | 1/2005 | Yoo et al. |
| 2005/0080850 A1 | 4/2005 | Salesky et al. |
| 2005/0132417 A1 | 6/2005 | Bobrovskiy et al. |
| 2005/0254775 A1 | 11/2005 | Hamilton et al. |
| 2006/0064716 A1 | 3/2006 | Sull et al. |
| 2006/0130124 A1 | 6/2006 | Richardson et al. |
| 2006/0161671 A1 | 7/2006 | Ryman et al. |
| 2006/0161959 A1 | 7/2006 | Ryman et al. |
| 2006/0274828 A1 | 12/2006 | Siemens et al. |
| 2007/0005795 A1 | 1/2007 | Gonzalez |
| 2007/0022155 A1 * | 1/2007 | Owens et al. ............... 709/202 |
| 2007/0057952 A1 | 3/2007 | Swedberg et al. |
| 2007/0106681 A1 | 5/2007 | Haot et al. |
| 2008/0068289 A1 | 3/2008 | Piasecki |
| 2009/0282444 A1 | 11/2009 | Laksono et al. |

FOREIGN PATENT DOCUMENTS

| | | |
|---|---|---|
| EP | 0 495 612 A2 | 7/1992 |
| EP | 0645695 | 3/1995 |
| EP | 1469382 | 10/2004 |
| GB | 2327836 | 2/1999 |
| WO | WO-2006/076389 A2 | 7/2006 |

OTHER PUBLICATIONS

X Desktop Group: "Extended window manager hints" [Online], May 13, 2003. Available at: http://standards.freedesktop.org/wm-spec/wm-spec-latest.html.

International Search Report for PCT/US2006/038629. Mailing date Feb. 23, 2007. 3 pages.

Written Opinion of the International Searching Authority for PCT/US2006/038629 dated Jan. 31, 2007.

International Search Report for corresponding International Application No. PCT/US2007/021098, mailed Feb. 22, 2008, 4 pages.

"Remote Desktop Environments Reflected in Local Windows" IBM Technical Disclosure Bulletin, Mar. 1993, vol. 36, Issue 3, pp. 421-426.

Adrian Nye, XLIB Programming Manual, Rel. 5, Third Edition, Jun. 30, 1994, O'Reilly Media, Inc., chapter 2.

Communication pursuant to Article 94(3) EP Application No. 07119879.0-1525; Dated Jun. 20, 2008; 8 pages.

Communication pursuant to Article 94(3) EPC EP Application No. 07120005.9-1525; Dated Jun. 20, 2008; 9 pages.

Communication Pursuant to Article 94(3) EPC for EP Application No. 07119913-1525; Dated Jun. 20, 2008; 12 pages.

Communication pursuant to Article 96(2) EPC dated Oct. 24, 2007; EP Application No. 06718013.3-1525; 6 pages.

Communication pursuant to Article 96(2) EPC EP Application No. 06718012.5-1525; Dated Oct. 24, 2007; 5 pages.

Crusty, "The Un-Official XviD FAQ," Mar. 4, 2004, pp. 1-50.

Cruz, G. and Hill, R., "Capturing and Playing Multimedia Events with Streams", in Proceedings of ACM Multimedia '94, San Francisco, CA, Oct. 15-20, 1994, pp. 193-200.

De Alwis, B., "Screen Capturing and Playback Using VNC," http://www.cs.ubc.ca/{bsd/vncrecording.html, Oct. 31, 2004.

European Exam Report for 06718012.5 dated May 27, 2011.

European Search Report EP Application No. 07119879 completed Jan. 16, 2008; 5 pages.

Extended European Search Report EP 0712005; Dated Dec. 14, 2007; 6 pages.

Extended European Search Report from EP Application No. 07119991.3-1525 completed Mar. 4, 2008; 9 pages.

Final Office Action dated Apr. 14, 2010, pertaining to U.S. Appl. No. 11/036,489, 24 pages.

Final Office Action dated Jan. 6, 2009, pertaining to U.S. Appl. No. 11/036,486, 46 pages.

Final Office Action dated Jan. 20, 2010, pertaining to U.S. Appl. No. 11/555,611, 19 pages.

Final Office Action dated Jul. 7, 2009, pertaining to U.S. Appl. No. 11/036,489, 16 pages.

Final Office Action dated Mar. 16, 2010, pertaining to U.S. Appl. No. 11/036,486, 41 pages.

Final Office Action dated Nov. 9, 2009, pertaining to U.S. Appl. No. 11/555,615, 30 pages.

Final Office Action dated Sep. 15, 2009, pertaining to U.S. Appl. No. 11/035,851, 13 pages.

International Search Report, PCT/US2006/000887, Jul. 24, 2006.

International Search Report, PCT/US2006/000888, Aug. 31, 2006.

International Search Report, PCT/US2007/081751, Nov. 5, 2008.

Krishnakumar A. S. et al., "VLSI Implementations of Communication Protocols—A Survey" IEEE Journal on Selected Areas in Communications, IEEE Service Center, Piscataway, NJ, vol. 7, No. 7, Sep. 1, 1989, pp. 1082-1090.

Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.

Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.

Non Final Office Action dated Apr. 14, 2009, pertaining to U.S. Appl. No. 11/035,851, 11 pages.

Non Final Office Action dated Apr. 29, 2008, pertaining to U.S. Appl. No. 11/036,486, 20 pages.

Non Final Office Action dated Aug. 3, 2009, pertaining to U.S. Appl. No. 11/036,486, 39 pages.

Non Final Office Action dated Dec. 10, 2008, pertaining to U.S. Appl. No. 11/036,489, 17 pages.

Non Final Office Action dated Jun. 3, 2009, pertaining to U.S. Appl. No. 11/555,611, 16 pages.

Non Final Office Action dated Mar. 30, 2009, pertaining to U.S. Appl. No. 11/555,615, 25 pages.

Non Final Office Action dated May 26, 2009, pertaining to U.S. Appl. No. 11/036,840, 11 pages.

Non Final Office Action dated Sep. 4, 2009, pertaining to U.S. Appl. No. 11/036,489, 21 pages.

Non-Final Office Action dated Dec. 23, 2009, pertaining to U.S. Appl. No. 11/035,511, 10 pages.

Non-Final Office Action dated Jan. 4, 2010, pertaining to U.S. Appl. No. 11/035,851, 14 pages.

Office Action for U.S. Appl. No. 11/035,511 dated Mar. 30, 2011.

Office Action for U.S. Appl. No. 11/035,851 dated Aug. 19, 2010.

Office Action for U.S. Appl. No. 11/036,489 dated Jun. 7, 2011.

Office Action for U.S. Appl. No. 11/555,611 dated Sep. 30, 2010.

Office Action on U.S. Appl. No. 11/036,489 dated Oct. 14, 2011.

Pedersen, E.R., McCall, K., Moran, T.P., and Halasz, F.G., "Tivoli: An Electronic Whiteboard for Informal Workgroup Meetings," Interchi '93,Apr. 24-29, 1993, pp. 391-398.

Reilly, R., "Today's Linux Screen Capture Technology," Newsforge, http://software.newsforge.com/article.pl?sid=04/08/16/2128226, Aug. 17, 2004.

Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.

Sandklef H., "Testing Applications with Xnee," Linux Journal, vol. 2004, No. 117, 2004, pp. 1-6.

Sandklef, H., "Xnee Manual," Manual Version 1.08D, http://web.archive.org/web/20040627125613/www.gnu.org/software/xnee/www/m-anual/xnee.pdf, Oct. 3, 2003.

ScreenPlay User's Guide, Release 2.0, Copyright. 1991-1993, RAD Technologies, Inc., Palo Alto, California, pp. 1-4, 9, 12-14, 30-37, and 44-66.

Smith, Advanced Linux Networking, Jun. 11, 2002, Addison Wesley Professional, Chapter 14, Section 4.

Stanonik, R., "Recording/Playing Both Gaze Date and Computer Interaction," http://hci.ucsd.edu/eye/gaze.txt, Nov. 30, 2000.

Stanonik, R., "Reversing the VNC Record File," http://web.archive.org/web/20060703115503/http://hci.ucsd.edu/eye/reversi- ng.txt, Mar. 18, 2002.

Wolf, C.G., Rhyne, J.R., and Briggs, L.K., "Communication and Information Retrieval with a Pen-based Meeting Support Tool," CSCW 92 Proceedings, Nov. 1992, pp. 322-329.

Written Opinion of the International Searching Authority to PCT/US2006/000887 (Jul. 4, 2006).

Written Opinion of the International Searching Authority to PCT/US2006/000888(Jul. 7, 2006).

Zeldovich, N. et al., "Interactive Performance Measurement with VNCPlay," USENIX 2005 Annual Technical Conference.

\* cited by examiner

From Step 330, FIG. 3A

- Step 330a — WM_GETMINMAXINFO: Analyze the position of the application and determined which display the application should be maximized and return the corresponding translated resolution

- Step 330b — WM_WINDOWPOSCHANGING: if the window is in the maximized state, the window flags for the window are modified to the no move style

- Step 330c — WM_WINDOWPOSCHANGED: location of the window is compared to the display layout, and if it is off-screen, then position of the window is changed to be on-screen

- Step 330d — WM_DISPLAYCHANGED: suspend processing windows message until updated display layout is obtained

*Fig. 3B*

SIMULATING MULTI-MONITOR FUNCTIONALITY IN A SINGLE MONITOR ENVIRONMENT

TECHNICAL FIELD

The present invention generally relates to virtualizing a display environment. More particularly, the present invention relates to systems and methods for providing a multiple display environment via one or more display devices.

BACKGROUND INFORMATION

In many cases, a user may connect from a client to a server to perform "server-based" or "thin-client" computing. The remote machine, or server, may execute an application on behalf of the client or the user of the client, and then communicate display output from the executing application to the client for displaying on the display of the local client machine. Typically, the client may have one computer monitor or display device, and the server is communicating display output targeted for a single display environment. However, in some cases, the client may be connected to multiple display devices. For example, a user of the client may desire to display one application on a first display device while displaying another application on a second display device. One or more of these applications may be a remote application running on a server.

In order for a server setup for a single display environment to communicate display output from an application running on the server to a client setup for a multiple display environment, the client environment may need to be setup in a restrictive manner that could limit the functionality and benefits of a multiple display environment. The server providing the remote application to the client via a remote session may associate a single display with the remote session. In some cases, the display layout for a client has to be organized in such a fashion that a monitor does not reside in the negative coordinate system. As such, the user may be limited to configuring the primary monitor set as the top left most monitor in the display layout.

In other cases, when displaying output on the client from an application executing on a server, the application may not maximize to the appropriate display in the multiple display environment of the client. For example, the application may be maximized to all displays or always to the top left display. In further cases, some applications that are not displayed on the top left display may have a window, such as a dialog or a menu, be displayed in the top left display disjoint from the application. In another case, problems may occur when changing the display environment while applications are being displayed on the client. For example, the resolution of a display device or the number of display devices may be changed. An application may be displayed on a device that is no longer configured in a display configuration or used by the client. This may cause the application to be rendered off-screen. As such, the application may have to be manually moved back on to a screen area of an existing display device of the new display layout.

In other situations, a client may have a single display environment, and may be running one or more applications, either remotely from a server or locally on the client. The single display environment may restrict or limit the user's use of the applications. For example, in one case, an application may be displayed in a large portion of the viewable screen area of the display. This may limit a user's ability to use other applications or to view items on the desktop of the computer. In other cases, the user may be trying to use and display multiple applications at the same time. For example, the user may want to view a side by side comparison between one document in one instance of a desktop or office application to another document in another instance of an office application. However, the user is limited to the viewable screen area of the display device to make the comparison. In another case, the user may frequently minimize and restore applications from a task bar on the desktop to switch between multiple applications.

Improved systems and methods are desired for virtualizing a display environment and providing multiple display environments for clients with one or more display devices.

SUMMARY OF THE INVENTION

The systems and methods of the present invention provide techniques for virtualizing multiple displays for an environment having one display device or less display devices than desired. The techniques of the present invention modify and control the behavior and appearance of an application window displayed on a client based on a desired display layout for the client. The display layout may be configured for multiple displays, which may or may not correspond to the number of physical display devices of the client. The present invention provides a window message processing mechanism to intercept a selected message to a window of an application. The window message provides for the behavior or appearance of a window used or displayed by the application. The window processing mechanism compares the behavior and appearance of the window in view of the desired display layout and modifies the message to display the window on the client based on the desired display layout. As such, the present invention processes selected window messages to translate the behavior or appearance of the window to the desired display layout.

Using the techniques of the present invention, a user can access a remotely available application in a server-based computing environment regardless of the monitor layout of the client or without restricted or limited client side setup. Instead of the server associating a single display with the remote session, the server will provide display output based on the client's desired display layout. The present invention allows a remotely provided application to maximize to the proper display from the perspective of the client, and allows menu items and other windows of an application to be displayed appropriately within an application, for example, without appearing disjoint from the application. Additionally, the present invention automatically detects an off-screen window and moves windows to be rendered to a viewable screen area. In summary, the present invention provides the functionality and benefits of a multiple display environment without requiring multiple display devices.

In one aspect, the present invention relates to a method for displaying a window of an application based on a client display environment. The method includes the steps of providing a desired display layout of a client using one or more display device, intercepting, by a window message processing mechanism, a message to a window displayed on the client by an application, and modifying, by the window message processing mechanism, the message to provide the window on the client based on the desired display layout. In one embodiment, the window message processing mechanism modifies the message to modify a behavior or an appearance of the window based on the desired display layout.

In some embodiments of the present invention, the desired display layout includes a resolution and a work area of the one or more display devices. The desired display layout may be stored to a storage element, and associated with the client. In another embodiment, the message identifies a change to a size, a position, or an attribute of the window. In some embodiments, the message comprises a change to one of the following: 1) a display resolution, 2) a maximized size and position, 3) a default minimum tracking size, or 4) a default maximum tracking size.

In one embodiment, the method of the present invention includes the window message processing mechanism intercepting the message related to a change to a position or a size of the window about to occur, determining a display of the desired display layout to which the window should be maximized, and modifying the message to maximize the window to a location and a resolution corresponding to the determined display. In another embodiment, the method of the present invention includes the window message processing mechanism intercepting the message related to a change to a position, a size, or an attribute of the window about to occur, determining if the window is in a maximized state, and, if the window is maximized, modifying an attribute of the window to fix the position, i.e., not allow movement, of the window on a screen area of a display. If the window was in a maximized state, then, in another embodiment, the window processing mechanism modifies the window's message to allows movement of the position of the window.

In some embodiments of the present invention, the method compares the window's location to the desired display layout to determine if the window is visible on a screen area of a display, and if the window is not located to be visible on the screen area of the display, modifying the position of the window to be visible on the screen area of the display. In a further embodiment, a session login mechanism compares the window's location upon reconnection of a session.

In additional embodiments, the method of the present invention includes the window message processing mechanism intercepting the message related to a change to a resolution of a display, suspending processing of messages to the window until a second or updated display layout is provided, and modifying messages to the window based on the second or updated display layout. In at least one embodiment, the window message processing mechanism of the present invention has a hooking mechanism to intercept a message comprising one of the following Windows operating system window messages: 1) WM_GETMINMAXINFO, 2) WM_WINDOWPOSCHANGING, 3) WM_WINDOWPOSCHANGED, and 4) WM_DISPLAYCHANGE.

In some embodiments, the application executes on an application server and displays output to the client via a remote display protocol. In one embodiment, the method includes displaying output to the client associated with the desired display layout having a display device in a negative coordinate system or a primary display device not in a top left display location. In another embodiment, the method includes modifying the message to maximize the window in a screen area of a display device displaying the application. In other embodiments, the method of the present invention includes modifying the message to display a menu of the application in a screen area of a display device displaying the application.

In another aspect, the present invention is related to a system for providing a multiple display environment on a client having one or more display devices. The system includes a client display layout representing a desired display environment of a client having one or more display devices. The system also includes a window message processing mechanism intercepting a message to a window provided by an application, and modifying the message to provide the window on the client based on the client display layout. In one embodiment, the message is related to a behavior or an appearance of the window. In some embodiments of the system, the window message processing mechanism of the present invention modifies a behavior or an appearance of the window based on the client display layout.

In other embodiments of the present invention, the application executes on the client or an application server. In one embodiment, the system includes an application server executing the application on behalf of the client and transmitting display output to the client via a remote display protocol. The remote display protocol includes one of the following protocols: 1) Independent Computing Architecture (ICA) and 2) Remote Desktop Protocol (RDP). In one embodiment, the client display layout has a resolution and a work area of the one or more display devices. In another embodiment, the client display layout may have a display device in a negative coordinate system or a primary display device not in a top left display location. In some embodiments, the system also includes an application server storing the client display layout in a storage element, and associating the stored client display layout with the client.

In some embodiments of the present invention, the message includes a change to a size, a position, or an attribute of the window. For example, the message may include a change to one of the following: 1) a display resolution, 2) a maximized size and position, 3) a default minimum tracking size, or 4) a default maximum tracking size. In one embodiment, the window message processing mechanism of the present invention intercepts the message related to a change to a position or a size of the window about to occur, determines a display device of the client display layout the window should be maximized to, and modifies the message to provide a location and resolution corresponding to the determined display. In some embodiments, the window message processing mechanism of the present invention intercepts the message related to a change to a position, a size, or an attribute of the window about to occur, determines if the window is in a maximized state, and if the window is maximized, modifies an attribute of the window to fix the position, i.e., not allow movement, of the window on a screen area of a display. If the window was in a maximized state, then, in one embodiment, the window processing mechanism modifies the message to allow movement of the position of the window.

In one embodiment of the present invention, the system also has a session login mechanism. The session login mechanism compares the window's location to the desired display layout to determine if the window's location is visible on a screen area of a display device, and if the window's location is not visible on the screen area of the display device, modifies the position of the window to be visible on the screen of the display device. In some embodiments, the window message processing mechanism intercepts the message related to a change to a resolution of a display, suspends processing of messages to the window until a second or updated display layout is provided, and modifies messages based on the second or updated display layout.

In one embodiment, the window message processing mechanism of the present invention modifies the message to maximize the window in a screen area on a display device displaying the application. In another embodiment, the window message processing mechanism modifies the message to display a menu of the application in a screen area on a display device displaying the application.

In a further aspect, the present invention is related to a method practiced in a thin-client or server-based computing environment for remotely displaying a window on a client having multiple display devices. The method includes requesting by a client having a plurality of display devices, to have an application executed on the application server and to have display output from the application executing on the application server transmitted to the client, transmitting, by the client, a desired display layout to the application server, and executing, by the application server, the application on behalf of the client. The method of the present invention further includes providing, by the application, the display output to have one or more windows display on the client according to the desired display layout of the client, and transmitting, by the application server, the display output to the client via a remote display protocol. The remote display protocol may be the Independent Computing Architecture (ICA) or the Remote Desktop Protocol (RDP).

In some embodiments, the method of the present invention associates, by the application server, the desired display layout with the client and stores the desired display layout on the application server. In one embodiment, the desired display layout is stored as a globally mapped data file. In another embodiment, the desired display layout includes a display device located in a negative coordinate system of a layout, and in other embodiment, the desired display layout has a primary display device not in a top left location of a layout.

In one embodiment of the present invention, the method may also include processing, by the client, the display output provided by the application to display the one or more windows on a display device of the plurality of display devices. In some embodiments, the method includes translating, by the application, a portion of the display output to a resolution of a display device of the plurality of display devices. In one embodiment, the method further includes maximizing, by the application, a window on a display device displaying the display output of the application. In another embodiment, the method may also provide for displaying, by the application, a menu or dialog window, on a display device displaying the display output of the application.

In additional embodiments, the method of the present invention includes providing a hooking mechanism in the application executed on the application server, and intercepting, by the hooking mechanism, a window message to a window of the application. The hooking mechanism modifies the window message to provide the display output regarding the window based on the desired display layout of the client. In one embodiment, the method also includes modifying, by the hooking mechanism, the window message to modify a behavior or an appearance of the window based on the desired display layout.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 3B is a flow diagram of steps performed for exemplary window messages in practicing an illustrative window processing method of the present invention;

DESCRIPTION

Figure 1A:
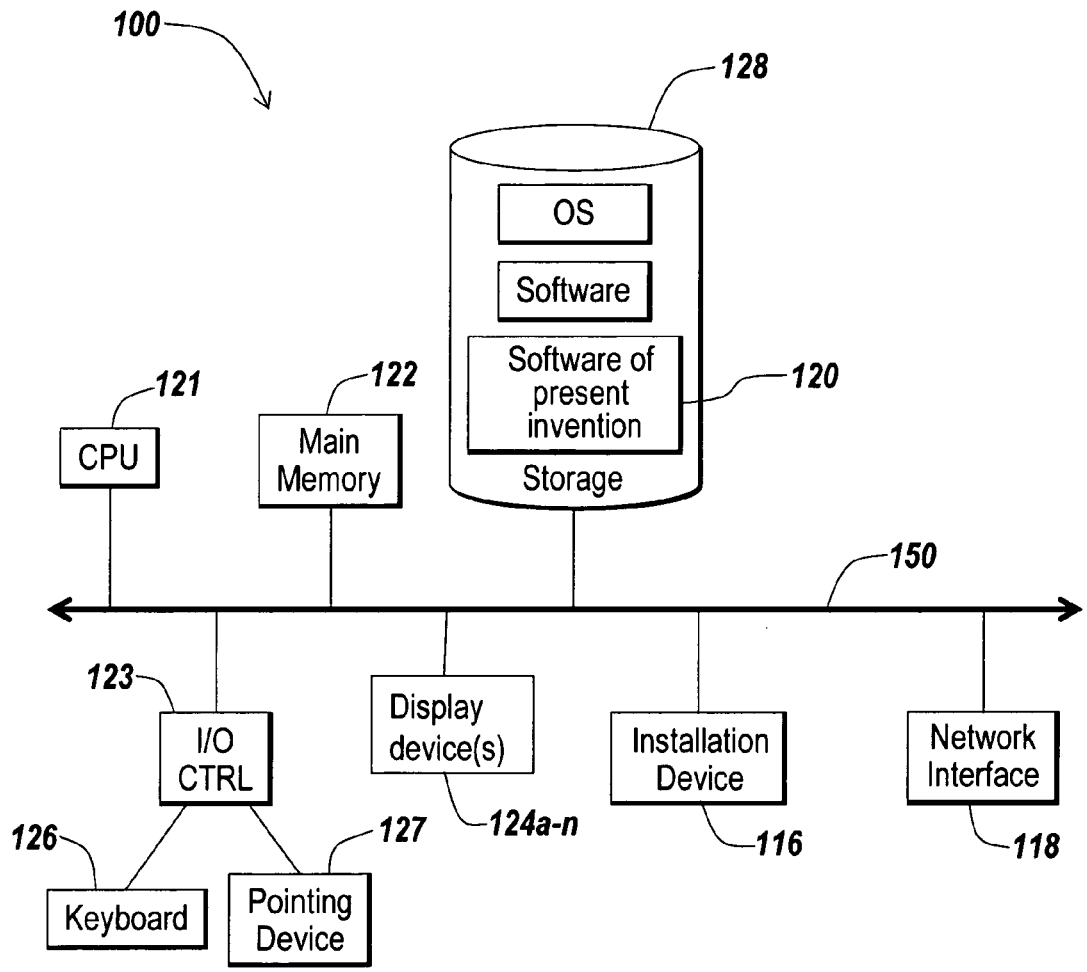
FIGS. 1A and 1B are block diagrams of embodiments of a computing device for practicing an illustrative embodiment of the present invention.

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the systems and methods of the present invention provide techniques for virtualizing a display environment of a client by modifying and controlling the behavior and appearance of an application's window based on a desired display layout for the client. The techniques of the present invention may be used for simulating or providing a multiple display setup for a single display environment. The illustrative embodiment of the present invention provides a window processing mechanism to intercept a selected message to a window of an application and modify the message to the window to display the window on the client based on the desired display layout. The message to the window provides for the behavior or appearance of a window used or displayed by the application. In one embodiment, the window processing mechanism of the present invention provides a hooking mechanism to an application's window procedure and replaces the original window procedure with a window procedure designed to intercept a selected window message and modify values of arguments or parameters of the intercepted window message based on the desired display layout of the client. As such, the present invention processes selected window messages to provide or translate the behavior or appearance of the window to the desired display layout.

The techniques and mechanisms of the present invention may be practiced in a server-based computing environment, such as between a client and server communicating via a remote display protocol. A server may be setup or configured for a single display environment while the client may be setup or configured for one or more display devices. For example, a session on a server, such as a session on a Microsoft® Windows server operating system may only be able to be configured or setup for a single display. The server may obtain a preferred or desired display layout for the client, and store the display layout in association with the client, such as associating the display layout with a remote session for the client. The window message processing mechanism of the present invention may be used by the server to intercept and modify selected messages to windows of the application running on the server on behalf of the client. The window messages are modified to provide a behavior or appearance of the window based on the display layout associated with the client. As such, the display output communicated by the server to the client includes display output to be displayed on the client according to the client's display layout rather than the display layout, e.g., single display layout, of the session on the server.

Using the techniques and mechanisms of the present invention allows a user to access a remotely available application in a server-based computing environment regardless of the monitor layout of the client. Instead of the server associating a single display with the remote session, the server will provide display output based on the client's display layout. Furthermore, the present invention allows a remotely provided application to maximize to the proper display from the perspective of the client. Also, the present invention allows menu items and other windows of an application to be displayed appropriately within an application, for example, without appearing disjoint from the application. Additionally, the present invention handles the issue of a window being rendered off-screen after changes to the display layout by automatically moving the window to a viewable upon detection of an off-screen window.

Furthermore, the techniques and mechanisms of the present invention may also be practiced in a local computing environment to virtualize, simulate, or otherwise provide a multiple monitor environment for a client having a single display device. Although the client may have a single display device, a desired display layout may be configured or provided to specify multiple displays. The window processing mechanism of the illustrative embodiment of the present invention may be used to intercept and modify window messages for an application on the client to control the behavior or appearance of the window based on the desired display layout instead of the actual monitor layout. As such, a user may gain the functionality, benefits, and advantages of a multiple monitor environment without having multiple display devices.

Although the illustrative embodiment may be generally discussed in relation to a Microsoft® Windows based operating system or environment, the present invention may also be practiced in other types of operating systems and environments, such as any type of Unix or Linux operating system, or a Mac OS® type of operating system. One ordinarily skilled in the art will recognize and appreciate in reading the detailed description of the illustrative embodiment below that the systems and methods of the present invention may likewise be practiced in these other operating systems and environments.

Figure 1B:
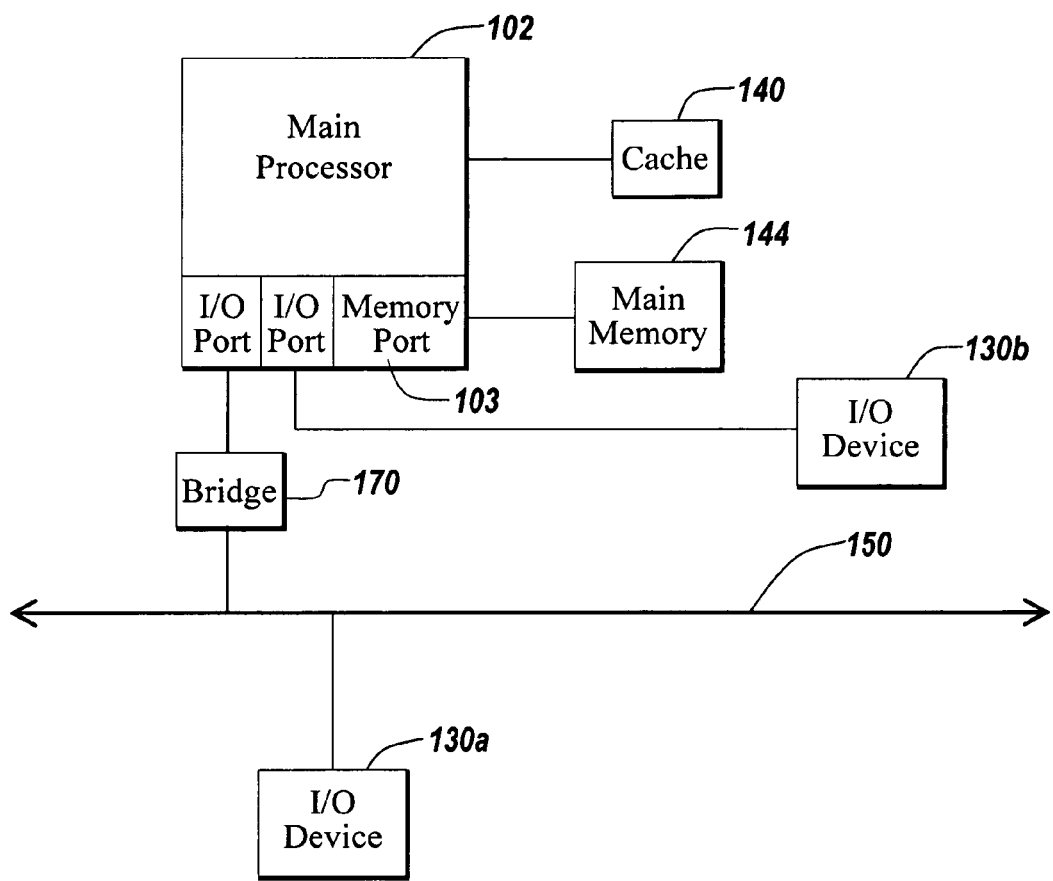

FIGS. 1A and 1B depict block diagrams of a computing device 100 useful for practicing an embodiment of the present invention. As shown in FIGS. 1A and 1B, each computing device 100 includes a central processing unit 102, and a main memory unit 122. As shown in FIG. 1A, a typical computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 122 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnected bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 120, or portion thereof, related to the present invention.

The computing device 100 may further comprise a storage device 128, such as one or more hard disk drives or redundant arrays of independent disks, for storing an operating system and other related software, and for storing application software programs such as any program related to the software 120 of the present invention. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Zire 71 personal digital assistant manufactured by Palm, Inc. In this embodiment, the Zire 71 operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2A:
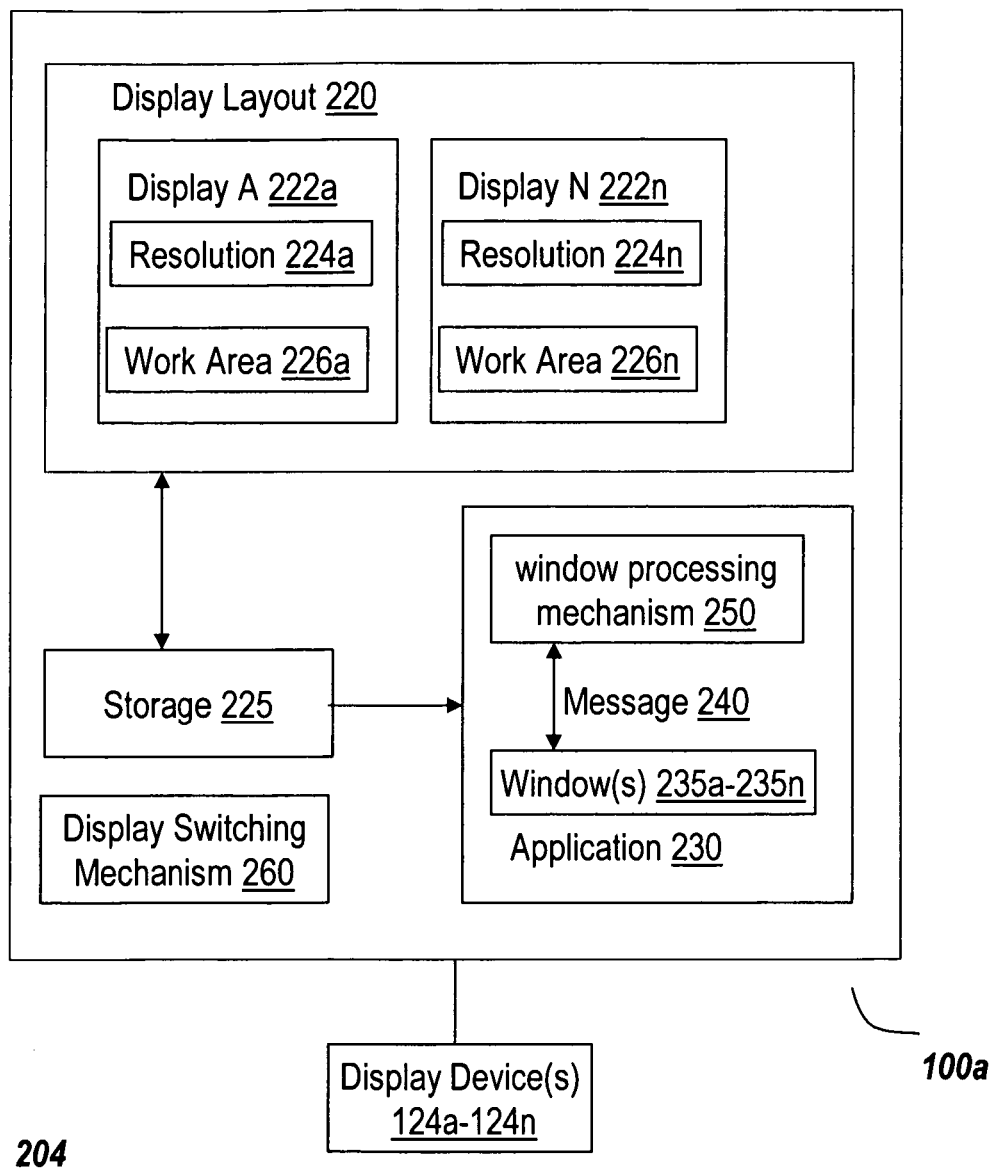
FIG. 2A is a block diagram of a computer environment for practicing an illustrative embodiment of the present invention.

In one aspect, the present invention relates to virtualizing a display environment of a client. The present invention provides techniques and mechanisms for directing or controlling the behavior and appearance of a window displayed by an application on a client based on a virtualized display layout. Referring now to FIG. 2A, one embodiment of an environment 202 in which the present invention may be used is depicted. In brief overview, a computing device 100a, also referred to as client 205, may be connected to or otherwise use a display device 124, in one embodiment, or multiple display devices 124a-124n, in another embodiment. The client 205 includes a display layout 220 comprising a desired display configuration for the client 205, such as for display device 124. The client 205 includes an application 230 providing one or more windows 235a-235n, and a storage element 225 for storing the display layout of the client 205. The client 205 also includes a window processing mechanism 250. The client 205 may be any workstation, desktop computer, laptop, handheld computer, mobile telephone, or other computing device 100 capable of communication and that has sufficient processor power and memory capacity to perform the operations described herein.

In further detail, the display layout 220 comprises any type and/or form of information or data to identify, specify, or describe a desired display layout configuration for the client 205. In one embodiment, the display layout 220 may comprise a file or set of files in any format. In another embodiment, the display layout 220 may comprise any information or data stored in any type and/or form of storage or memory element provided by the computing device 100. In an additional embodiment, the display layout 220 may be provided or stored in any suitable type and/or form of database. In further embodiments, the display layout 220 may be provided via any object, data structure, or application programming interface (API). The display layout 220 may comprise any graphical, textual, or combination of graphical and textual elements. The display layout 220 may be created, edited, configured, or otherwise provided by any suitable means and/or mechanisms, such as a graphical and/or text-based tool, program or application. In one embodiment, a graphical tool with a user interface may be used to design, create, edit and configure the display layout 220.

The display layout 220 may include attributes, properties, characteristics, values, settings, profiles, and other display configuration information 222a-222n to define each display for the client 205. The display layout 220 may include display configuration 222a-222n for each of the desired displays, physical, virtual, or otherwise. In some embodiments, the display layout 220 includes a description of the layout, location, position, organization, or arrangement for each display device 124a-124n. In one embodiment, the display layout 220 includes a visual or graphical arrangement identifying the location and/or size of each monitor with respect to each other. In some embodiments, each display 222a-222n is identified by an identifier, such as a name or number. Also, the display configuration 222a-222n may include a monitor type, a screen refresh rate, adapter type, adapter information, screen resolution, a color quality, a color scheme, a font size, a background, a style for buttons and menus, and a screen saver.

Additionally, the display configuration 222a-222n may include information or data to identify or specify a resolution 224a-224n and/or a work area 226a-226n for each display, such as the display corresponding to a display device 124a-124n. In one embodiment, the resolution 224a-224n identifies the number of pixels, or individual points of color, contained on a display monitor, expressed in terms of the number of pixels on the horizontal axis and the number of pixels on the vertical axis. As those ordinarily skilled in the art will appreciate, the sharpness of the image displayed on the display device 124a-124n may depend on the resolution and the size of the display device 124a-124n. In another embodiment, the work area 226a-226n identifies the usable dimensions of the screen area of the display device 124a-124n in pixels. In some embodiments, the work area 226a-226n does not include the dimensions of the screen area not useable by the user, such as the portion of the screen area having a menu, tool, or task bar, such as the task bar on a desktop provided via a Microsoft® Windows operating system.

In one embodiment, the display layout 220 is configured to correspond to the number of display devices 124a-124n, and their available features and characteristics, accessible by the client 205. In other embodiments, the display layout 220 does not match or correspond to the number of display devices 124a-124n connected to the client 205. For example, the client 205 may have a single display device 124a but the display layout 220 may be configured for multiple display devices 124a-124n. In one aspect, the display layout 220 may be configured for a display device 124a that is virtual, or a virtual display device. A virtual display device is rendered off the screen area of the physical display device 124a and may be placed on and off the visible screen area by any suitable mechanism and/or means, such as for example, tabbing between desktops, or panning and scrolling beyond the work area of the physical display device 124a. A virtual display device may comprise a resolution 224a-224n, a work area 226a-226n, and any other data or information in a display configuration 222a-222n as if it was a physical display device 224a-224n connected or to be connected to a computing device 100.

In some embodiments, the work area 226a-226n of the virtual display device is relative to and/or adjacent horizontally or vertically to the screen area of the physical display device 124a-124n. In other embodiments, the resolution 224a-224n of the virtual display device is the same resolution 224a-224n of the physical display device 124a, or one of the resolutions 224a-224n supported by the physical display device 124a. In some embodiments, a display 222a corresponding to a physical display device 124a is not required to be configured as the top left monitor. In other embodiments, the display layout 220 may comprise any arrangement of positive and/or negative coordinate systems, and any displays 222a-222n, or display devices 124a-124n, virtual or otherwise, may be configured to be located with any positive and/or negative coordinates, or in any portion of the positive and/or negative coordinate system.

The storage element 225 illustrated in the client 205 of FIG. 2A may comprise any type and/or form of storage or memory, such as random-access memory, a disk drive, a disk array, a rewriteable optical drive, shared memory, a database, a file, an object, a data structure, or any other type and/or form of storage or memory element that allows the storing of and access to information or data, such as the display layout 220. In one embodiment, storage element 225 provides the display layout 220 as a globally mapped data file, which may be accessible by any of the applications 230 of the client 205. In some embodiments, the storage element 225 stores the display layout 220, or a portion of the display layout 220. In other embodiments, the display layout 220 may be converted, translated, transformed or otherwise altered to be stored in the storage element 225. Although the storage element 225 is illustrated on the client 205, another computing device 100 accessible to the client 205, such as a server, may have a storage element for storing the display layout 220.

The client 205 may execute or otherwise provide one or more applications 230. The application 230 can be any type and/or form of software, program, or executable instructions such as any type and/or form of web browser, web-based client, client-server application, a thin-client computing client, an ActiveX control, or a Java applet, or any other type and/or form of executable instructions capable of executing on client 205. In some embodiments, the application 230 provides one or more windows 235a-235n, also sometimes collectively referenced herein as 235. In one embodiment, the window 235a-235n is a graphic, sometimes rectangular in shape, having either some kind of user interface or graphical or textual representation of the output of, and in some cases, allowing input for the application 230. In another embodiment, the window 235a-235n comprises an area on the screen that displays information, including user documents as well as communications such as alert boxes and dialog boxes. Additionally, the user may open or close a window, move it around on the display, and sometimes change its size, scroll through it, and edit its contents.

In one embodiment, the user interface for the application 230 is the window 235a-235n. In other embodiments, the application 230 provides a top level window 235a-235n for the presentation and/or navigation structure or framework for the application 230, and provides additional windows 235a-235n in response to input or other events. For example, the application 230 may have a menu system and screen area for a user interface represented by a top level window 235a, and based on user input, displays a secondary or smaller window 235 to provide output to the user and/or receive input from the user regarding the application 230.

The application 230, and/or any windows 235a-235n of the application may receive a message 240, such as a window message, as input. The message 240 may be any type and/or form of communication via any type and/or form of medium. In some embodiments, the message 240 comprises a communication to a window 235a-235n to control or direct the behavior, appearance, attributes, or properties of the window 235a-235n. In an exemplary embodiment of a Microsoft® Windows-based environment, the application 230 is event-driven, and waits for the operating system, or system, to pass input to them. The system passes all input for an application to the various windows 235a-235n in the application 230. Each window 235a-235n has a function, called a window procedure, which the operating system calls in response to receiving input for the window. A window procedure is a function that receives and processes all messages sent to the window. A window class, i.e., an API for creating a window, has a window procedure, and every window created with that class uses that same window procedure to respond to messages. The window procedure processes the input and returns control to the system. The system passes input to a window procedure in the form of a message 240, which may be generated by the operating system or other applications 230. A message 240 may be generated for an input event, for example, when the user types, moves the mouse, or clicks a control such as a scroll bar. A message 240 may also be generated in response to changes in the operating system or computing device brought about by an application 230. An application 230 can generate messages to direct windows 235a-235n of the application 230 to perform tasks or to communicate with windows 235a-235n in other applications.

In the exemplary embodiment of a Microsoft® Windows-based system, a message 240 is sent to a window procedure with parameters. In one embodiment, the message 240 comprises a set of four parameters: a window handle, a message identifier, and two values referred to as message parameters. The window handle identifies the window for which the message is intended, and is used to determine which window procedure should receive the message. A message identifier identifies a purpose or function of the message 240. When a window procedure receives a message, it uses the message identifier to determine how to process the message. For example, a message identifier WM_PAINT of a message 240 may indicate to a window procedure that the window's 235 client area has changed and must be repainted. The parameters of a message 240 may specify data or the location of data used by a window procedure when processing a message 240. The meaning and value of the parameters may depend on the message 240. A message parameter can include an integer, a string, packed bit flags, a pointer to a structure containing additional data, or any type and/or form of data or information.

Although a message 240 is generally described in the context of a Microsoft® Windows based environment, a message 240 may be any type and/or form of communication in any type of operating system or environment, as one ordinarily skilled in the art would recognize and appreciate, to control or direct the appearance, behavior and attributes of a window 240 being displayed or otherwise being used, processed, or provided by the application 230. As such, the message 240 may be in a form and have content suitable to the environment or operating system for which the operations of the present invention may be practiced.

Still referring to FIG. 2A, the window processing mechanism 250, also referred to as a window message processing mechanism, of the present invention provides the means and mechanism for changing, controlling or directing an appearance, behavior or attribute of the window 235a-235n of an application 230 based on the desired display layout 220 of the client 205. The window processing mechanism 250 may comprise an application programming interface (API), application, module, software component, library, service, process, task or any other form and/or type of executable instructions designed to and capable of executing or providing the functionality of the present invention as described herein. The window processing mechanism 250 may comprise software, hardware, or any combination of software and hardware. In some embodiments, an application 230 may be designed or constructed to include the functionality of the window processing mechanism 250, while in some other embodiments, the window processing mechanism 250 is designed and constructed to be used by existing applications 230, for example, without changing the application 230.

In one embodiment, the window processing mechanism 250 comprises a mechanism for subclassing window procedures of a window 235 of the application 230, and providing a window procedure that gets called or used in place of the original window procedure of the window 235. In one embodiment, a hooking mechanism is used by the window processing mechanism 250 to provide the replacement window procedure. In some embodiments, a hooking mechanism comprises using an application programming interface (API) to replace the executable instructions or code of a function, procedure, or API with a desired set of executable instructions or code. For example, the window processing mechanism 250 may introduce a hooking mechanism for any API related to creating, establishing, or providing a window 235, for example, the CreateWindowA, CreateWindowW, CreateWindowExA, and CreateWindowExW APIs of the Microsoft® Windows operating system environment. In some embodiments, the window procedure is replaced via the Windows application programming interface (API) calls of GetWindowLong and SetWindowLong. In other embodiments, the replaced window procedure is stored in a list of any suitable type and/or form along with a window handle or reference to the replaced window procedure. As such, the window procedure used by the window processing mechanism 250 may call the replaced window procedure. For example, the window processing mechanism 250 may pass through a message 240 to the original window procedure for processing.

The window procedure of the window processing mechanism 250 may be constructed and designed to intercept all or a portion of the messages 240 communicated to or received by the window 235. In some embodiments, the window procedure intercepts all messages 240 and any messages 240 not to be modified are communicated to the original or replaced window procedure. In one embodiment of a Microsoft® Windows based environment, the window procedure of the window processing mechanism 250 intercepts messages 240 with a message identifier comprising one of the following: 1) WM_DISPLAYCHANGE, 2) WM_WINDOWPOSCHANGED, 3) WM_WINDOWPOSCHANGING, and 4) WM_GETMAXMININFO. A WM_DISPLAYCHANGE message 240 communicates to a window 235 a change in a resolution 224 of a display 124. A WM_WINDOW-POSCHANGED message 240 communicates to a window 235 a change in a size, position, or a place in the Z order for the window 240. A WM_WINDOWPOSCHANGING message 240 is communicate to a window 235 when a change in a size, position, or a place in the Z order for the window 240 is about to occur. A WM_GETMAXMININFO message 240 is communicated to a window 235 when a size or position, or a window 240 is about to change.

The window processing mechanism 250 intercepts a message 240 and modifies a return value or parameter of the message 240 to correspond to or be based on the display layout 220. In some embodiments, the window processing mechanism 250 intercepts messages 240 for a top-level window 235, and in other embodiments, the window processing mechanism 250 intercepts messages for windows 235 that are not a top-level window. In further embodiments, the window processing mechanism 250 intercepts messages 240 for a certain set of windows 240. For example, the window processing mechanism 250 may be configured to intercept windows 250 defined in a list, database, storage 225, or any other type and/or form of configuration medium.

The message 240 intercepted by the window processing mechanism 250 may have return values, arguments, and/or parameters designed or targeted for the actual display layout of the client 205 or server 210, but the window processing mechanism 250 changes the return values, arguments and/or parameters to be designed or targeted for the display configuration 222a-222n provided by the desired display layout 220. The window processing mechanism 250 may read, access, acquire or otherwise obtain the display layout 220 from the storage element 225 by any suitable means and/or mechanism. The window processing mechanism 250 may comprise any type of logic, functionality, business rules, or operations to obtain the values, arguments, and parameters of the message 240 and analyze, compare or otherwise process the values, arguments, and parameters of the message 240 in view of the display layout 220, and determine any changes or modifications to the values, arguments or parameters or the message 240 to display the window 235 on a display identified by the display layout 220. The window processing mechanism 250 modifies the message 240 according to the determined changes and communicates the message 240 to the window 235. In some embodiments, the window processing mechanism 250 determines the message 240 does not need to be modified and thus communicates the message 240 in the same form as intercepted by the window processing mechanism 250. In other embodiments, the window processing mechanism 250 replaces the message 240 with a second message.

The systems and methods of the present invention may be practiced locally for a client 205 to virtualize, simulate, or provide a multiple display environment when the client 205 only has a single display device 124, or has less display devices 124a-124n than desired. For example, the display layout 220 may identify multiple display configurations 222a and 222n. Display configuration 222a may comprise information about the physical display device 124 connected to the client 205 while display configuration 222n comprises information about a virtual display or virtual display device. In one embodiment, since there is a single display device 124, any displaying of an application 230 and windows 235a-235n for the virtual display may occur off of the screen or work area of the physical display device 124. As such, the client 205 may include any type and/or form of display switching mechanism 260 to switch the virtual display into the screen area or work area of the physical display device 124. For example, the display switching mechanism 260 may include any mechanism to detect certain key strokes for switching between displays or for movement of the mouse or cursor indicating the user desires to scroll or pan to screen areas not currently visible on the display device 124.

In further embodiments of the environment 202 of FIG. 2A, the display layout 220 may be configured to provide multiple displays inside the screen or work area of the single display device 124. In one embodiment, the work area 226 of display device 124 may be arranged into any number of portions, sections or quadrants, which may be of equal dimensions or not. For example, a first virtual display may be the left half of the work area 226 of the display device 124 and a second virtual display may be the right half of the work area 226. As such, a single large monitor or display device 124 may be virtualized into multiple displays via the mechanisms and techniques of the present invention. Additionally, the techniques and mechanisms of the present invention may be used for a single display environment with a display layout 220 for a single display to control the behavior, appearance and attributes of a window in a desired manner. For example, every time an email application 230 is maximized, the window processing mechanism 250 may modify the message 240 to the window 230 to display the window in the top left or right corner of the work area 226.

Figure 2B:
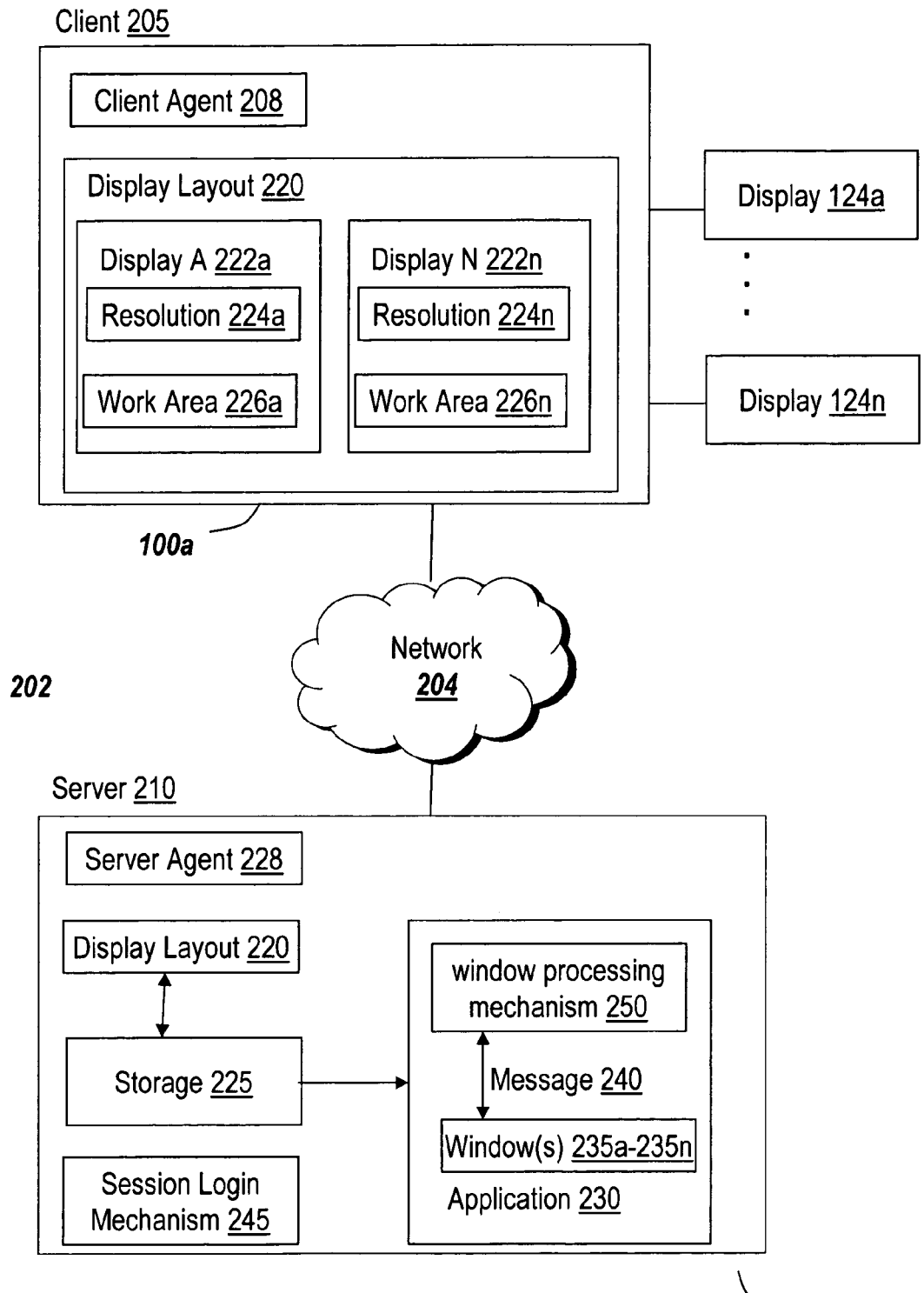
FIGS. 2B and 2C are block diagrams of illustrative embodiments of a networked computer environment for practicing the present invention.

Referring now to FIG. 2B, another embodiment of a networked computer environment 200 for practicing the present invention is illustrated. In brief overview, a first computing device 100a, also referred to as the client 205, communicates with a second computing device 100b, also referred to as server 210, via one or more communication networks 204. The client 205 may be connected to or otherwise use one or more display devices 124a-124n. The client 205 includes a display layout 220 comprising a desired display configuration for the client 205, such as for display devices 124a-124n. The client 205 may also include a client agent 208. The server 210 includes an application 230 providing one or more windows 235a-235n, and a storage element 225 for storing the display layout 220 of the client 205. The server 210 also includes a server agent 228, a session login mechanism 245, and a window processing mechanism 250.

The environment 200 may provide a server-based or thin-client computing environment for practicing the operations of the present invention described herein. For example, the application 230 may be an application executed on the server 210 on behalf of the client 205. The display output from execution of the application 230 may be communicated to the client 205 for display on the client, for example, via the client agent 208. The display output may be communicated between the server 210 and client 205 via a remote display protocol. The display output may be based on a window 240 of the application 230 running on the server 210 but to be displayed on the client 205. As will be described in further detail below, the window processing mechanism 250 on the server 210 intercepts and modifies messages 240 of the application 230 running on the server 210, communicates the message 240 to the window 235. As such, the display output communicated to the client 205 reflects the modified message 240 processed by the window 235.

Although FIG. 2B shows a network 204 between the client 205 and the server 210, there may be additional networks, e.g., 204', 204" between the client 205 and the server 210. The client 205 and the server 210 may be on the same network 204 or on a different network 204'. The networks 204 and 204' can be the same type of network or different types of networks. The network 204 and/or the network 204' can be a local-area network (LAN), such as a company Intranet, a metropolitan area network (MAN), or a wide area network (WAN), such as the Internet or the World Wide Web. The topology of the network 204 and 204' may be a bus, star, or ring network topology. The network 204 and network topology may be of any such network or network topology capable of supporting the operations of the present invention described herein.

The client 205 can be a local desktop client on a local network 204 or can be a remote display client of a separate network 204'. The server 210 may be any type of computing device 100 capable of operating as described herein. Furthermore, the server 210 may be provided as a group of server systems logically acting as a single server system, referred to herein as a server farm. In one embodiment, the server 210 is a multi-user server system supporting multiple concurrently active client connections or user sessions.

In one embodiment, as shown in FIG. 2B, a client agent 208 is included within the client 205. The client agent 208 can be, for example, implemented as a software program and/or as a hardware device, such as, for example, an ASIC or an FPGA. An example of a client agent 208 with a user interface is a Web Browser (e.g. a Microsoft® Internet Explorer browser and/or Netscape™ browser). The client agent 208 can use any type of protocol, such as a remote display protocol, and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Protocol (RDP) client agent from Microsoft Corporation of Redmond, Wash. In some embodiments, the client agent 208 is configured to connect to the server 210. In some embodiments (not shown), the client 208 includes a plurality of client agents 208, each of which may communicate with a server 210, respectively.

Additionally, the server 210 may comprise a server agent 228 which may be capable of and configured to work in conjunction with the client agent 208. For example, the server agent 228 may be a server side component that accepts connections and requests from the client agent 208. In another embodiment, the server agent 228 may be capable of and configured to accept or establish remote access connections or sessions for the client 205. In one embodiment, the client agent 208 and server agent 228 may communicate using a protocol, such as http, ICA or RDP, over the network 204. In some embodiments, the client agent 208 and/or server agent 228 are used to establish, re-establish, maintain, or otherwise provide a server-based computing or thin-client computing based connection or session. In another embodiment, the client agent 208 and the server agent 228 establish the start and end points of communications for a connection between the client 205 and the destination server 210.

The client 205 and server 210 can connect to the one or more networks 204, 204' through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), and wireless connections or any combination thereof. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, and direct asynchronous connections). In one embodiment, the client 205 and the server 210 communicate via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla.

In some embodiments, the server 210 include a storage element 225 for storing the display layout. In one embodiment, storage element 225 provides the display layout 220 as a globally mapped data file, which may be accessible by any of the applications 230 of the server 210. In some embodiments, the display layout 220 is stored in the same form as provided to or received by the server 210. Although the storage element 225 is illustrated on the server 210 in FIG. 2B, the client 205 may also include a storage element 225', and in some embodiments, the client 205 stores the display layout 220 in the client's storage element 225', and/or to the server's storage element 225.

The server 210 may also include a session login mechanism 245, which may include any type and/or form of service, process, task or program, application, or executable instructions on the server 210 to handle and process login or session requests. The session login mechanism 245, or any portion thereof, may be provided via the operating system of the server 210. In one embodiment, the session login mechanism 245 includes the windows logon process, winlogon, a component of the Microsoft® Windows families of operating systems. As such, the session login mechanism 245 may provide interactive logon support, and may include a Graphical Identification and Authentication dynamically linked library (DLL) referred to as the GINA, and any number of network providers. The session login mechanism 245 may include any interfaces, such as an application programming interface (API) or dynamically linked libraries, i.e., a dll, to allow any resource, application, network or network provide gather obtain any identification and authentication information during a logon process.

The session login mechanism 245 may perform an authentication process and password-updating operations for the operating system and/or for one or more resources, programs, applications, networks, or network providers. In one embodiment, the session login mechanism 245 provides authentication services for the operating system, and in additional embodiments, also provides authentication services for access to applications 230 to be executed on the server 210 on behalf of the client 205, such as in a server-based or thin-client computing model. Additionally, the session login mechanism 245 may monitor any mouse and/or keyboard activity related to logging on or secure access of the server 210, or any resource, application, network, or network provider. In some embodiments, the session login mechanism 245 may establish any initial services, processes, or tasks for a user or session on the server 210.

The server 210 may execute or otherwise provide one or more applications 230. The application 230 can be any type and/or form of software, program, or executable instructions such as any type and/or form of web browser, web-based client, client-server application, a thin-client computing client, an ActiveX control, or a Java applet, or any other type and/or form of executable instructions capable of executing on client 205 or communicating via a network 204. The application 230 can use any type of protocol and it can be, for example, an HTTP client, an FTP client, an Oscar client, or a Telnet client. In some embodiments, the application 230 uses a remote display or presentation level protocol. In other embodiments, the application 230 comprises any type of software related to Voice-Over-Internet Protocol (VoIP) communications, such as a soft IP telephone. In further embodiments, the application 230 comprises any application related to real-time data communications, such as applications for streaming video and/or audio. In some embodiments, the application 230 provides one or more windows 235a-235n, also sometimes collectively referenced herein as 235.

In some embodiments, the server 210 or a server farm may be running one or more applications 230, such as an application 230 providing a thin-client computing or remote display presentation application. In one embodiment, the server 210 or server farm executes as an application 230, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application 230 is an ICA client, developed by Citrix Systems, Inc. of Fort Lauderdale, Fla. In other embodiments, the application 230 includes a Remote Desktop (RDP) client, developed by Microsoft Corporation of Redmond, Wash.

Additionally, the server 210 may run an application 230, which for example, may be an application server providing email services such as Microsoft Exchange manufactured by the Microsoft Corporation of Redmond, Wash., a web or Internet server, or a desktop sharing server, or a collaboration server. In some embodiments, any of the applications 230 may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office LiveMeeting provided by Microsoft Corporation of Redmond, Wash.

Figure 2C:
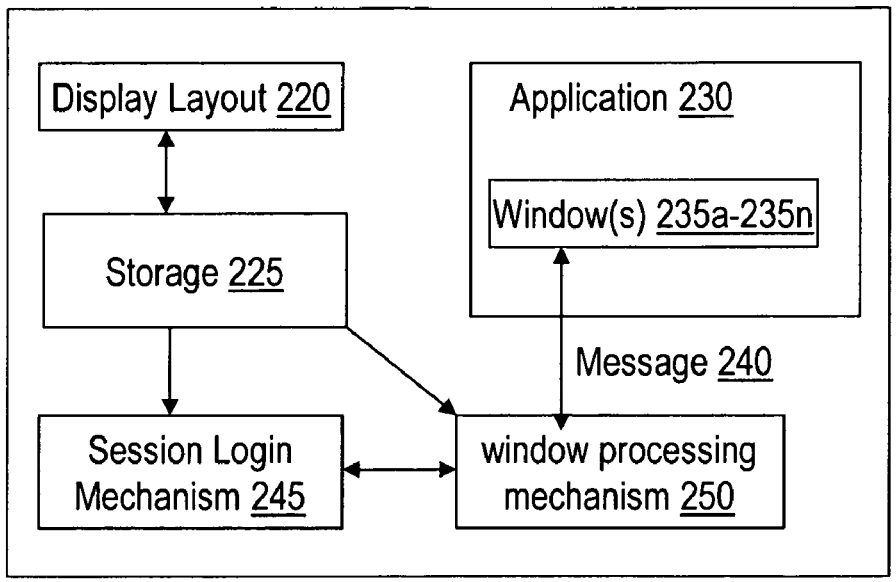

Although in FIG. 2A and FIG. 2B, the window processing mechanism 250 is illustrated as included in the application 230, the window processing mechanism 250 may reside in any portion of the server 210, the client 205, and/or external to the application 230, for example, as illustrated in FIG. 2C. In one embodiment, the window processing mechanism 250 comprises a service, process, or task that runs in a system context or with the system privileges of the operating system. In some embodiments, the windows processing mechanism 250 may monitor messages 240 communicated to windows 235a-235n of an application 230, and intercept and modify the message 240 to the windows 235a-235n. One ordinarily skilled in the art will recognize and appreciate that the windows processing mechanism 250 may comprise any type and/or form of executable instructions capable of performing the operations of the present invention described herein.

In another embodiment of environment 201 illustrated in FIG. 2C, the present invention may be practiced using the session login mechanism 245. In this embodiment, the server 210 may use the session login mechanism 245 to provide for or use any of the functionality of the window processing mechanism 250 of the present invention. In some embodiments, the session login mechanism 245 may read, access, acquire or otherwise obtain the display layout 220 from the storage element 225. In other embodiments, the session login mechanism 245 accesses, loads, or uses the functionality of the window processing mechanism 250 via a dynamically loaded library, such as a library provided via a network provider to the winlogon process of a Microsoft® Windows operating system. In other embodiments, the session login mechanism interfaces with or communicates to the window processing mechanism 250 to provide the techniques of the present invention. In further embodiments, the session login mechanism 245 may use the techniques of the present invention during reconnection, re-establishment, and/or re-authentication of a login or user session, such as a remote session in a server-based computing environment 200.

Figure 3A:
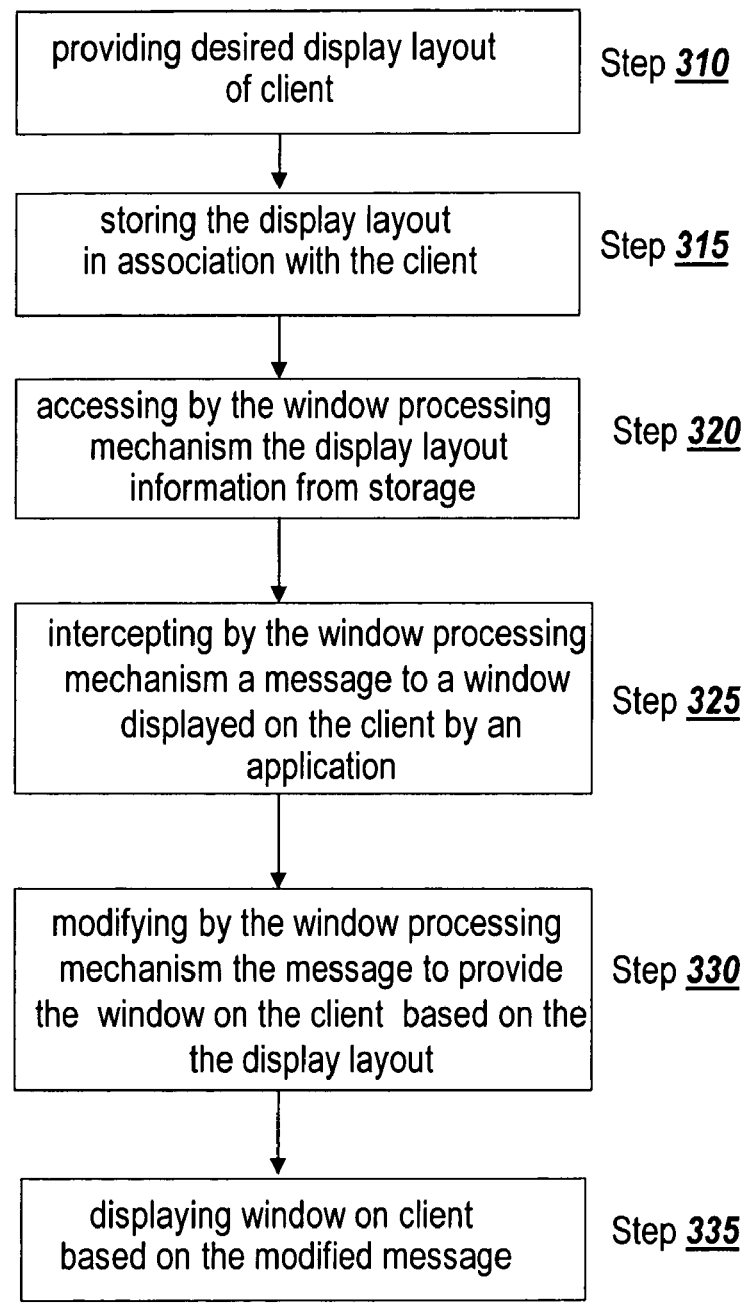
FIG. 3A is a flow diagram of steps performed in practicing an illustrative window processing method of the present invention.
Figure 3C:
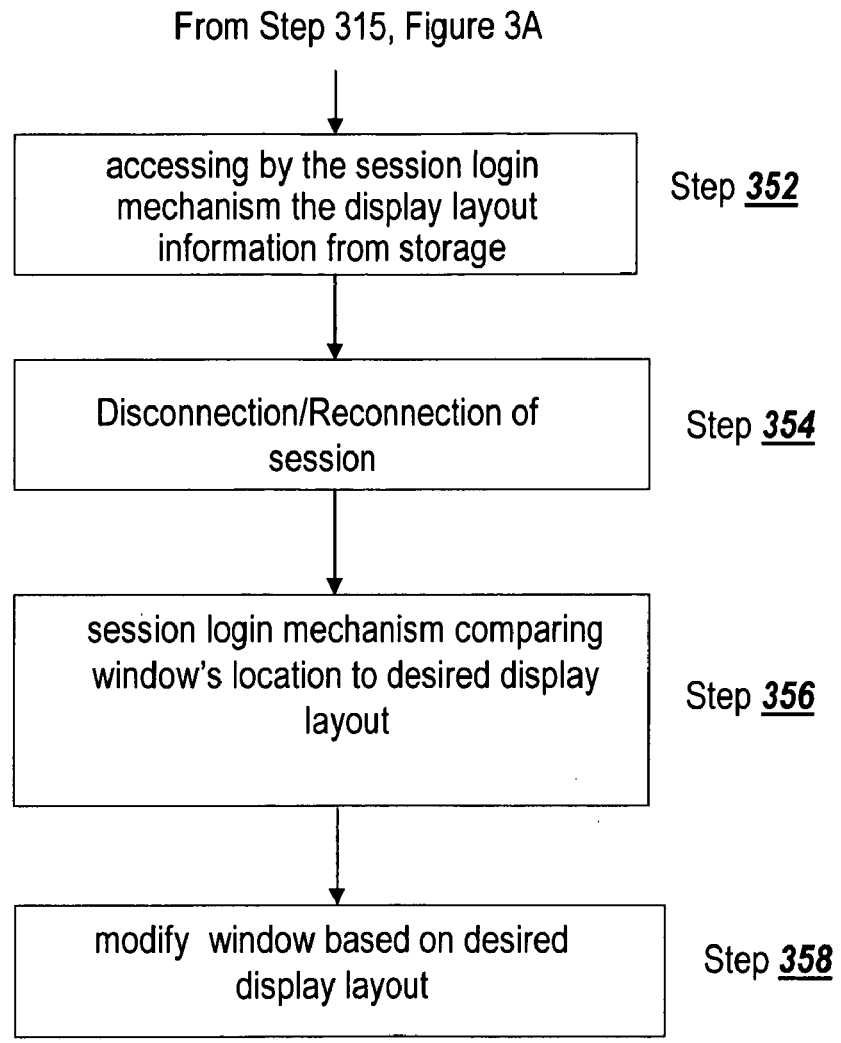
FIG. 3C is a flow diagram of steps performed in practicing an illustrative embodiment of the present invention upon reconnecting a session.
Figure 3D:
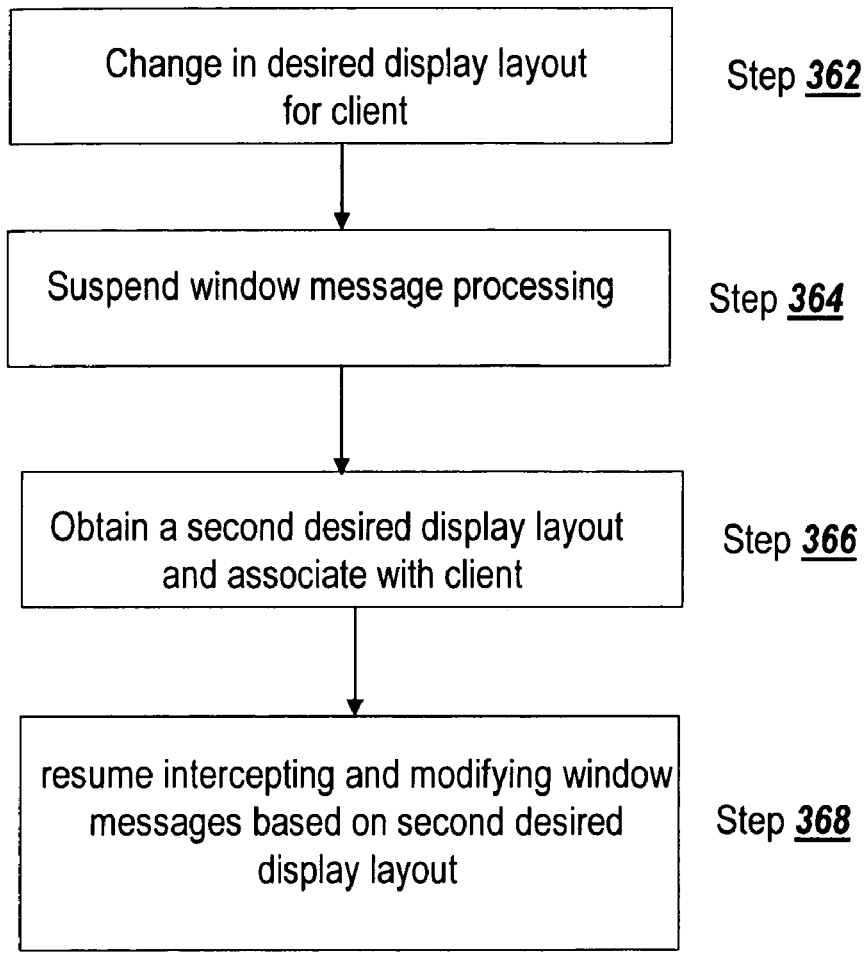
FIG. 3D is a flow diagram of steps performed in practicing an in practicing an illustrative embodiment of the present invention upon changing a client's display layout configuration.

In another aspect, the present invention is related to techniques for virtualizing a display environment of a client 205 by controlling or directing the appearance, behavior and attributes of a window 235 of an application 230 based on the desired display layout 220 for a client 205. In view of the systems and structure of the environments 200, 201, and 202 illustrated in FIGS. 2A-2C, the operations, functionality, and techniques of the present invention will be discussed as illustrated by the methods of FIGS. 3A-3D. FIG. 3A depicts illustrative method 300 for practicing an embodiment of the present invention using the window processing mechanism 250. FIG. 3B depicts illustrative examples of window messages and processing used in conjunction with illustrative method 300. FIG. 3C depicts illustrative method 350 for practicing an embodiment of the present invention when reconnecting, re-establishing or re-authenticating via the session login mechanism 245. FIG. 3D depicts illustrative method 360 for changing the client's display layout 220, for example, during execution of an application 230.

Referring now to FIG. 3A, in brief overview, illustrative method 300 of the present invention provides a desired display layout 220 of the client 205 at step 310, and at step 315, stores the display layout 220 in the storage element 225, and associates the display layout 220 with the client 205. At step 320, the window processing mechanism 250 accesses the display layout 220 from the storage element 225 to obtain the desired display layout information for the client 205. At step 325, the window processing mechanism 250 intercepts messages 240 to a window 235 displayed on a client 205 by an application 230. At step 330, the window processing mechanism 250 modifies the message 240 to provide the window 235 on the client 205 based on the desired display layout 220 for the client 205. At step 335, the window 235 is displayed on the client 205 based on the modified message 240. As such, the appearance and behavior of the window 235 is translated to and based on the display layout 220.

In further detail, at illustrative step 310 of the method of the present invention, the desired display layout 120 for the client is provided. In one embodiment, the display layout 120 is communicated from the client 205 to the server 210. For example, the client 205 establishes a connection or communication session with the server 210. In some cases, the server 210 requests the display layout 220 from the client 205, and the client 205 communicates the display layout 220 in response to the request. In another embodiment, the display layout 220 is communicated via the session login mechanism 245 during a logon or authentication process, and in some embodiments, upon a re-logon or re-authentication process. In one embodiment, the display layout 220 is stored in a database and queried by the client 205 or server 210 to obtain the display layout 220. In other embodiments, the display layout 220 is downloaded, by either the client 205 or the server 210 from a web server, a web-site, an application server, another server 210' or via the Internet. In further embodiments, a user may configure the display layout 220 with a program, application, or tool, and store the display layout 220 on a client 205, server 210, or another computing device 100.

At illustrative step 315, the display layout 220 is stored in the storage element 225, and associated with the client 205. In some embodiments, the server 210 receives the display layout 220 from the client 205 and stores the display layout 220 in the storage element 225. In one embodiment, the server 210 stores the display layout 220 as a globally mapped data file on the server 210 accessible by one or more applications 230. In another embodiment the server 210 stores the display layout 220 to another computing device 100 accessible to the server 210, such as via the network 204. In some embodiments, the client 205 stores the display layout 220 to a storage element 225 on the server 210, to a storage element 225 on the client 205, or to a storage element 225 accessible via the network 204 or via the Internet.

The display layout 220 may be stored to the storage element 225 in any form suitable to the storage element 225, and may be converted, transformed, altered, translated or otherwise processed for storage in the storage element 225. For example, in one embodiment, the display layout 220 may comprise data, such as a file, on the client 205 transmitted via network packets to the server 210, and then translated into a globally mapped data file on the server 210. In another embodiment, the display layout 220 is stored into any type and/or form of database 225, such as a relational database. In other embodiments, the display layout 220 is stored in storage 225 comprising memory. For example, the display layout 220 may comprise or be represented by any type of object, data structure, or portion of memory on the client 205 and/or server 210.

The display layout 220 may be associated with the client 205 by any suitable means and/or mechanisms. In one embodiment, the name, or any portion thereof, of the globally mapped data file may identify the client 205. In another embodiment, any portion of content of the globally mapped data file may identify the client 205. In additional embodiments, the client 205 or server 210 may use any type of object, data structure, process, or other elements in memory to associate the display layout 220 with the client 205. In other embodiments, the client 205 or server 210 may use portions of the storage element 225 or other types of storage, such as another file, to associate the display layout 220 with the client.

The window processing mechanism 250, at step 320 of illustrative method 300, accesses the display layout 220 from the storage element 225 to obtain the desired display layout information for the client 205. In one embodiment, the executable instructions of the window procedure used by the window processing mechanism 250 comprises instructions to load, read, or otherwise acquire the display layout 220. For example, the window processing mechanism 250 may perform any type and/or form of file input/output, i.e., file I/O, operations to read a globally mapped data file having the display layout 220. In another embodiment, the instructions of the hooking application programming interface (API) for the window processing mechanism 250 provides instructions for obtaining the display layout 220. In another embodiment, the application 230 reads or accesses the display layout 220, for example, upon execution or start up. In some embodiments, the application 230 may be executed during a session, such as a user or remote session. In one embodiment, the globally mapped data file 225 may only be accessible by an application 230 associated with or available via the remote session. In further embodiments, access to the globally mapped data file may have access locked by a mutex or semaphore, which is global for the remote session. One ordinarily skilled in the art will recognize and appreciate that any type and/or form of locking mechanism can be used to control access the storage element 225, such as a globally mapped data file.

At illustrative step 325, the window processing mechanism 250 of the present invention intercepts messages 240 to a window 235 displayed on a client 205 by an application 230. In one embodiment, upon obtaining the display layout 220 a hooking mechanism is introduced into the server 210 or the application 230 on the server 210, which hooks one or more window creation application programming interfaces (APIs), such as for example, a create window type of API in a Microsoft® Windows based environment. In some embodiments, the window processing mechanism 250 intercepts all messages 240 to windows 235 of the application 230. In other embodiments, the window processing mechanism 250 intercepts messages 240 of a certain message identifier or name. In one embodiment, the message 240 may have arguments, parameters or values that are used by the window processing mechanism 250 to determine that the message 240 should be intercepted. In additional embodiments, the window processing mechanism 250 intercepts messages 240 to some of the windows 235 of the application 230, and in further embodiments, only for a portion of the types of messages 240 communicated to these windows 235. In yet another embodiment, the window processing mechanism 250 is configurable, for example, by a user, to select the messages 240, by name, type, or otherwise, to be intercepted.

In some embodiments, the window processing mechanism 250 intercepts messages 240 communicated to or intended for a top-level window 235 of the application 230. In other embodiments, the window processing mechanism 250 may intercept any level of window 235, or only certain levels of windows 235 in a hierarchy of windows 235. For example, the window processing mechanism 250 may ignore any popup dialog windows of a second level window displayed on top of or in front of a top-level window 235.

In one embodiment, the window processing mechanism 250 may intercept a message 240 but pass the message 240 through or communicate the message 240 to the original or replaced window procedure. In some embodiments, the window processing mechanism 250 ignores certain messages 240. In another embodiment, the window procedure of the window processing mechanism 250 also includes the functionality and operations of the replaced window procedure. As such, the window processing mechanism 250 may intercept a message 240 and have either the replaced window procedure or the window procedure hooked into the application 240 process the message 240.

At step 330, the window processing mechanism 250 modifies the message 240 to provide the window 235 on the client 205 based on the desired display layout 220 for the client 205. In some embodiments, the window processing mechanism 250 examines, inspects, analyzes, or otherwise processes any values, arguments, or parameters of the message 240 in comparison to the display layout 220 for the client 205 displaying the application 230. Based on the comparison, the window processing mechanism 250 may modify, adjust, edit, change, alter, replace, translate or otherwise set or provide values, arguments, and/or parameters for the message 240 that will provide the desired behavior, appearance and attributes of the window 235 as displayed or to be displayed by the application 230 on the client 205 in accordance with the display layout 220. For example, the values and/or parameters of the message 240 may indicate a size, position, location, resolution or other attributes of the window 235. These characteristics may be based on a display environment different than as specified in the display layout 220. As such, in some embodiments, the window processing mechanism 250 may modify the size, position, location, resolution or other attributes of the message 240 for a display 222a-222n specified in the display layout 220.

By way of further example, and referring now to FIG. 3B, the window processing mechanism 250 may intercept and modify a message 240 identified as one of the following: 1) WM_GETMAXMININFO, 2) WM_WINDOWPOSCHANGING, 3) WM_WINDOWPOSCHANGED, and 4) WM_DISPLAYCHANGE. At illustrative step 330a, for a message 240 intercepted and identified as a WM_GETMINMAXINFO, the window processing mechanism 250 analyzes the position of the application 230, i.e., a top-level window 235, relative to the one or more displays 222a-222n of the display layout 220, and determines which of the displays 222a-222n the application 230 should be maximized to.

The window processing mechanism 250 modifies the message 240 to provide values corresponding and translated to the resolution based on the desired display layout 220. For example, in the server-based computing environment 200 of FIG. 2B, the server-based application 230 may provide window resolution for a single monitor session, and the window processing mechanism 250 translates the resolution to the multiple display environment provided via the display layout 220. As such, this technique enables the application 230 to maximize to a desired location in accordance with the display layout 220, instead of the single monitor session.

At illustrative step 330b, for a message 240 intercepted and identified as WM_WINDOWPOSCHANGING, the window processing mechanism 250 determines if the window 235 is in the maximized state, and if so, the message 240 is modified to set the window flag to a no move style of window, or otherwise to fix the location or position of the window 235, or not allow the position of the window 235 to change. As such, in the maximized state a user may not be able to move the window 235. This technique enables the application 230, or a window 235 of the application 230 to be maximized to a set or fixed location on a display 222a-222n specified by the display layout 220. In some embodiments, either in response to the WM_WINDOWPOSCHANGING message 240 or otherwise, the window processing mechanism 250 determines the window 235 is not in the maximized state, and modifies the message 240 to remove the no move style, e.g., the window's position is no longer fixed, or to otherwise allow the position of the window 235 to be moved.

At illustrative step 330c, for a message 240 intercepted and identified as WM_WINDOWPOSCHANGED, the window processing mechanism 250 compares the position or location of the window 235 to the display layout 220 and if the window 235 is to be rendered outside the screen or work area of display 222a-222n, then the position or location of the window 235 is changed to be rendered in at least a portion of the screen or work area of the display 222a-222n. This technique enables the user not to lose the application 230 or window 235 of the application 230 to an off-screen location.

At illustrative step 330d, for a message 240 intercepted and identified as WM_DISPLAYCHANGED, the window processing mechanism 250 suspends passing of messages 240 until a new or second display layout 220 is obtained or provided for the client 205. In one embodiment, the window processing mechanism 250 suspends the processing of all messages 240. In some embodiments, the window processing mechanism 250 suspends messages 240 that are intercepted and communicated to the replaced or original window procedure. In other embodiments, the window processing mechanism 250 suspends messages for the replaced or original window procedure while continuing to process other messages 240. This technique enables a client 205 to dynamically change the display layout 220 at any time, for example, during the execution of an application 230.

Although the techniques of the present invention are generally described above in relation to message examples illustrated in FIG. 3B, one ordinarily skilled in the art will recognize and appreciate that any message of any type and/or form may be used in practicing the present invention. Furthermore, the window processing mechanism 250 may perform any logic, function, operations or rules based on the message 240 and/or the display layout 220, and even for the same type of message 240, may perform a different operation or function for each instance of the message 240 depending on changes to the display layout 220 or any events, conditions or status of the environment 200, 201 or 202.

Referring back to FIG. 3A, at step 335 of illustrative method 300 of the present invention, the window 235 is displayed on the client 205 based on the message 240 processed via the window processing mechanism 250. As such, when the window processing mechanism 250 modifies the message 240 based on the display layout 220, the window 235 is displayed on the client 205 according to the display layout 220. In some embodiments, the window processing mechanism 250 does not modify the message 240, and therefore, the window 240 is displayed on the client 205 according to the unmodified message 240. The technique of the present invention as illustrated above enables for example, in one embodiment of a server-based computing environment 200, an application 230 running on server 210 to provide display output to the client 205 that controls and directs the behavior, appearance, and attributes of windows in the display output in any manner desired and specified by the display layout 220, which may not correspond to the physical display layout of the client 205.

In another aspect, although the present invention is generally described with a window management system from Microsoft® Windows operating system, one ordinarily skilled in the art will recognize and appreciate that the present invention may be practiced with any type and/or form of window manager or management system, such any type and/or form of X-windows managers, including any custom or open-source based window manager running on any type of operating system.

Referring now to FIG. 3C, the techniques of the present invention may be practiced during the re-connection, re-establishment or re-authentication of any communication session or user session, for example a remote display session between the client 205 and the server 210. In one embodiment, the session login mechanism 245 as illustrated on the server 210 of FIGS. 2A and 2B may include the window processing mechanism 250, or any portion thereof. In brief overview of illustrative method 350, the session login mechanism 245 of the present invention, at step 352, accesses or obtains the display layout 220 from the storage element 225. At step 354, there may be a disconnection and reconnection processed by the session login mechanism 245. Upon re-establishing and/or re-authenticating the session, the session login mechanism, at step 356, compares a location of a window 235 to the client's display layout 220, and at step 358, modifies the window 235 to display on the client 205 based on the client's display layout 220.

At illustrative step 352, the session login mechanism 245 obtains information on the display layout 220 by any suitable means and/or mechanisms. For example, the window processing mechanism 250 included in or used by the session login mechanism 245 may have executable instructions, such as file I/O operations, to access a globally mapped data file 225. In another embodiment, the session login mechanism 245 may load dynamically linked libraries that load, read or otherwise access the storage element 225 having the display layout information. In one embodiment, as part of establishing or re-establishing the session, the session login mechanism 245 may obtain the display layout 220 from the client 220. For example, the session login mechanism 245 requests the display layout 220 from the client 205 along with any identification or authentication credentials.

At illustrative step 354, any type of disconnection or disruption to a session between the client 205 and server 210 may occur, and any type of reconnection or re-establishment of the session may be facilitated via the session login mechanism 245. In some cases, a user may cause a disconnection or disruption, temporary or otherwise, to a session between the client 205 and the server 210 due to physical changes in the client's display environment or because the user moves to another computing device 100. In one case, the user moves from a first computing device 100a, such as a work computer, to a second computing device 100b, such as a home computer. The server 210 may maintain the same user session between computing devices 100a-110b but the display layout 220 may have changed. In another case, the user and/or the client 205 may traverse network segments or network access points that cause changes in the network address or host name, e.g., internet protocol (IP) address, of the client 205 or causes the client 205 to disconnect. The client 205 may reconnect, manually or automatically, to the network 204, such as via the client agent 208. As such, the session login mechanism 245 may facilitate or be used to facilitate the reconnection.

At step 356 of illustrative method 350 of the present invention, the session login mechanism 245 compares the location or position of a window 235 of an application 230 in relation to the desired display layout 220. In some embodiments, the session login mechanism 245 intercepts a message 240 to a window 235, and examines, inspects or analyzes any portion of the message 240, such as a value or parameter. In one embodiment, the session login mechanism 245 queries, acquires or obtains the current location or position of one or more windows 235 of the application 230 via an application programming interface (API). In another embodiment, the session login mechanism 245 requests from the application 230, the location or position of any of the application's windows. The session login mechanism 245 compares the location, position, size, and any other attributes of the window 235 to any information in the display layout 220.

At step 358, the session login mechanism 245 may modify the window 235 based on the desired display layout 220. From the comparison of the information about the window 235 to the information of the display layout 220, the session login mechanism 245, in some embodiments, modifies the window 235 to display on the client 205 via a display 222a-222n identified in the display layout 220 in a desired manner. In one embodiment, via the functionality of the window processing mechanism 250 embodied in or interfaced with the session login mechanism 245, a message 240 to a window 235 may be intercepted and modified in accordance with the operations of the present invention described herein. In another embodiment, the session login mechanism 245 may modify one or more windows 235 of the application 230 via any application programming interface (API) to modify such windows 235. The techniques depicted by illustrative method 350 enable client sessions to be disconnected and reconnected and have the display of windows be adjusted accordingly to any new or changed display environments of the client 205, new or changed display layouts 220 of the client 205, or changes from one computing device 100a to another computing device 100b.

In another aspect, the present invention is related to dynamically changing a display layout 220 for a client 205. Referring now to FIG. 3D, the techniques of the present invention may be practiced for a change to a display layout 220 that occurs during the execution of an application 230. In brief overview of illustrative method 360, at step 362, a client's display layout 220 is changed. At step 364, the window processing mechanism 350 suspends window message processing when the client's display layout 220 is changed. At step 366, an updated or a second display layout 220' is obtained by the window processing mechanism 250, and at step 368, the window processing mechanism 250 resumes intercepting and modifying messages 240 to windows 235 based on the second display layout 220'.

In further detail, at illustrative step 362, the display layout 220 may be changed at any time and for any reason during course of practicing the present invention. In one embodiment, the display environment for the client 205 may change and the display layout 220 may be updated to reflect the changed display environment. For example, another display device 124 may be connected to the client 205. In another embodiment, a user of the client 205 may be making adjustments, updating or otherwise changing the display layout 220 to suit the user's desire for a behavior and appearance of applications 230 and the display of windows 235 of the application 230 on the client 205. In yet a further embodiment, a first session may be on a first client 205 with a first display layout 220, and the user switches to a second session or maintains the first session on a second client 205' with a second or updated display layout 220'.

At illustrative step 365, the method of the present invention suspends intercepting and modifying messages 240 for windows 235 of an application 230 upon notification of a change to the display layout 220. In one embodiment, the window processing mechanism 250 intercepts a message 240, such as the WM_DISPLAYCHANGE message, indicating a change in any attribute or characteristic, for example, the resolution, of the display environment. In another embodiment, the client 205 communicates a notice to the server 210, the window processing mechanism 250 or the session login mechanism 245 indicating a change has occurred or is about to occur to the display layout 220. In yet another embodiment, the application 230 may comprise a user interface mechanism for a user to indicate a change to the display environment, or to have the application 230 suspend processing of window messages according to the display layout 220.

The window processing mechanism 250 may suspend the processing of messages 240 for all applications 230, a portion of applications 230, or for a portion of windows 235 of one, some, or all of the application 230. In one embodiment, the window processing mechanism 250 queues any messages 240 received until the window processing mechanism 250 obtains another display layout 220. In another embodiment, the window processing mechanism 250 only suspends processing of window messages to be modified according to the display layout 220, and continues passing the messages 240 not to be modified to the original or replaced window procedure.

At illustrative step 366, the method of the present invention obtains an updated or a second display layout 220' to use for window message processing. The updated or second display layout 220' may be provided by any suitable means and/or mechanisms. In one embodiment, the updated or second display layout 220' is stored with the first display layout 220 in the storage element 225. In another embodiment, the updated or second display layout 220' is stored as an updated version of the first display layout 220, and in further embodiments, the second display layout 220' may replace the first display layout 220 in the storage element 225. In one embodiment, the client 205 communicates the updated or second display layout 220' to the server 210 or stores the second display layout 220' to the storage element 225 on the server 210. In some embodiments, the client 205 via a reconnection or re-establishment to the server 210 may provide an updated display layout 220. In one embodiment, the client 205 communicates an unchanged display layout 220 or a display layout 220 to the server 210 that the server 210 already has stored in the storage element 225. In yet other embodiments, the server 210 or client 205 may obtain the second display layout 220' from another computing device 100 on the network 204, such as downloading the second display layout 220' form a server.

As described above in connection with illustrative method 300, the window processing mechanism 350 may obtain the display layout 220 from the storage element 225 by a variety of means and/or mechanisms.

At step 368 of illustrative method 360, the window processing mechanism 250 of the present invention resumes intercepting and modifying messages 240 to windows 235 based on the second display layout 220. In one embodiment, if the window processing mechanism 250 queued any messages 240, the window processing mechanism 250 analyzes and modifies the queued messages 240 based on the second display layout 220'. Otherwise, the window processing mechanism 250 uses the second display layout 220' to modify any messages 240 intercepted after obtaining the second display layout 220'. Using the techniques of the present invention, a client display environment and a client's display layout can be dynamically changed during the course of executing one or more applications, and the display of windows for the application appear and behave according to the changes to the display layout. For example, another display device may be added to the client, and an application may be minimized during a change in the display layout. When the display layout is updated, the user can maximize the application and have the application appear in the appropriate display even though the display environment changed when the application was minimized.

In view of the functions, structures, and operations described above, the present invention provides systems and methods to control and direct the appearance, behavior and attributes of windows of an application in a flexible manner for virtualizing, simulating or providing a multiple display environment without restricting or limiting the client side display configuration. For example, the display layout of the client may not be limited to configure the physical monitor of the client as the primary display, i.e. as the top left most monitor in the display layout configuration. The present invention may be practiced in a server-based or thin-client based computing environment, with clients having multiple display devices, or with clients having a single display device. Additionally, the present invention provides for the configuration of a display layout that is not restricted or limited to the physical display environment of the client. The present invention can extend the display environment of the client to include additional virtual displays, so if the client has two display devices, the present invention can be applied to virtualize or simulate three or more displays for the client. The present invention may also be practiced with a single display configuration for a single display device but still change the appearance and behavior of windows based on a desired or customized display layout. With the present invention, a client or user may gain the functionality, benefits, and advantages of a multiple display environment without having multiple display devices, or having all the display devices desired.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A method for displaying, in a client display environment having an associated display layout identifying multiple physical display devices, at least one window produced by an application executing on an application server, the method comprising:

receiving, by the application server, a desired display layout from a client, the display layout identifying multiple display devices;

storing, by the application server, the received desired display layout in a storage element on the application server;

associating, by the application server, the stored desired display layout with the client;

intercepting, by a window message processing mechanism executing on the application server, a message to a window displayed on the client, the message generated by an application executing on the application server for display on the client, wherein the application server is a separate device from the client and configured to communicate with the client via a remote display protocol;

accessing, by the window message processing mechanism the stored desired display layout associated with the client;

modifying, by the window message processing mechanism, the message according to the desired display layout; and transmitting, by the application server, the modified window message to the client via the remote display protocol, the modified window message causing the client to display the window according to the desired display layout;

obtaining, by the window message processing mechanism, notification of a change from the desired display layout to a second display layout of the client display;

suspending, by the window message processing mechanism, interception of a second message during a time period corresponding to the change from the desired display layout to the second display layout by queueing the second message in a queue during the time period;

resuming interception of the second message upon expiration of the time period; and modifying, by the window message processing mechanism, the second message according to the second display layout.

2. The method of claim 1, further comprising modifying the message to modify one of a behavior or an appearance of the window based on the desired display layout.

3. The method of claim 1, wherein receiving the desired display layout further comprises receiving the desired display layout from a client, the display layout identifying a resolution and a work area for multiple display devices.

4. The method of claim 1, wherein modifying the message further comprises changing one of a size, a position, and an attribute of the window.

5. The method of claim 1, wherein modifying the message further comprises changing one of a display resolution, a maximized size and position, a default minimum tracking size, and a default maximum tracking size.

6. The method of claim 1, further comprising:

intercepting, by the window message processing mechanism, the message related to a change to one of a position or a size of the window about to occur;

determining, by the window message processing mechanism, a display of the desired display layout the window should be maximized to; and modifying, by the window message processing mechanism, the message to maximize the window to a location and a resolution corresponding to the determined display.

7. The method of claim 1, further comprising:
intercepting, by the window message processing mechanism, the message related to a change to one of a position, a size, or an attribute of the window about to occur;
determining, by the window message processing mechanism, if the window is in a maximized state; and
if the window is maximized, modifying, by the window message processing mechanism, an attribute of the window to fix the position of the window on a screen area of a display.

8. The method of claim 1, wherein comparing further comprises comparing, by a session login mechanism, the window's location upon reconnection of a session.

9. The method of claim 1, further comprising:
intercepting, by the window message processing mechanism, the message related to a change to a resolution of a display;
suspending, by the window message processing mechanism, processing of messages to the window until a second display layout is provided; and
modifying, by the window message processing mechanism, messages to the window based on the second display layout.

10. The method of claim 1, wherein modifying by the window message processing mechanism comprises modifying by the window message processing mechanism including a hooking mechanism to intercept a message comprising one of the following Windows operating system window messages: WM_GETMINMAXINFO, WM_WINDOWPOSCHANGING, WM_WINDOWPOSCHANGED, and WM_DISPLAYCHANGE.

11. The method of claim 1, comprising modifying the message to maximize the window in a screen area of a display device displaying the application.

12. The method of claim 1, comprising modifying the message to display a menu of the application in a screen area of a display device displaying the application.

13. The method of claim 1, further comprising:
intercepting, by the window message processing mechanism executing on the application server, a second message to the window displayed on the client;
replacing, by the window message processing mechanism, the second message with a third message; and
transmitting, by the application server, the third message to the window on the client via the remote display protocol, the third message causing the client to display the window according to the desired display layout.

14. The method of claim 1, further comprising:
intercepting, by the window message processing mechanism executing on the application server, a second message in an original form to the window displayed on the client;
determining, by the application server, that the message is to be maintained in the original form; and
transmitting, by the application server, the second message in the original form to the client via the remote display protocol, the second message in the original form causing the client to display the window according to the desired display layout.

15. The method of claim 1, wherein the message to the window displayed on the client is configured for a top-level window, further comprising:

intercepting, by the window message processing mechanism executing on the application server, a second message to the window displayed on the client, wherein the second message is configured for a second-level window associated with a popup dialog window; and
transmitting, by the application server, the second message in at least one of an original form and a modified form to the client via the remote display protocol.

16. The method of claim 1, wherein the desired display layout associated with the client includes a first display device, further comprising:
obtaining, by the window message processing mechanism, notification of an update to the desired display layout associated with the client, wherein the update includes an addition of a second display device to the desired display layout; and
transmitting, by the application server, the modified window message to the client via the remote display protocol, the modified window message causing the client to display the window according to the desired display layout including the first display device and the second display device.

17. A system for displaying at least one window produced by an application executing on an application server in a multiple display environment at a client, the system comprising:
a receiver receiving from a client a desired display layout identifying multiple display devices;
a storage element provided by the application server storing the received display layout and associating the received display layout with the client; and
a window message processing mechanism executed by the application server to:
intercept a message to a window on the client, the message generated by an application executing on an application server for display on the client, wherein the application server is a separate device from the client and configured to communicate with the client via a remote display protocol,
access a desired display layout associated with the client, and
modify the message according to the desired display layout; and
a transmitter transmitting the modified window message to the client via the remote display protocol, the message causing the client to display the window according to the desired display layout, wherein execution by the application server causes the window processing mechanism to:
obtain notification of a change from the desired display layout to a second display layout of the client display;
suspend interception of a second message during a time period corresponding to the change from the desired display layout to the second display layout by queueing the second message in a queue during the time period;
resume interception of the second message upon expiration of the time period; and
modify the second message according to the second display layout.

18. The system of claim 17, wherein the window message processing mechanism modifies one of a behavior or an appearance of the window based on the client display layout.

19. The system of claim 17, wherein the client display layout comprises a resolution and a work area of the multiple display devices.

20. The system of claim 17, wherein the window message processing mechanism intercepts the message related to a change to one of a position or a size of the window about to occur, determines a display device of the client display layout the window should be maximized to, and modifies the message to provide a location and resolution corresponding to the determined display.

21. The system of claim 17, wherein the window message processing mechanism intercepts the message related to a change to one of a position, a size, or an attribute of the window about to occur, determines if the window is in a maximized state, and if the window is maximized, modifies an attribute of the window to fix the position of the window.

22. The system of claim 17, comprising a session login mechanism, the session login mechanism compares the window's location to the client display layout to determine if the window's location is visible on a screen area of a display device, and if the window's location is not visible on the screen area of the display device, modifies the position of the window to be visible on the screen of the display device.

23. The system of claim 17, wherein the window message processing mechanism intercepts the message related to a change to a resolution of a display, suspends processing of messages to the window until a second display layout is provided, and modifies messages based on the second display layout.

24. The system of claim 17, wherein the window message processing mechanism modifies the message to maximize the window in a screen area on a display device displaying the output from the application.

25. The system of claim 17, wherein the window message processing mechanism modifies the message to display a menu of the application in a screen area on a display device displaying the output from the application.

* * * * *